United States Patent
Sakuma

(10) Patent No.: US 10,282,329 B2
(45) Date of Patent: May 7, 2019

(54) TRANSMISSION SYSTEM THAT INCLUDES MASTER DEVICE AND A PLURALITY OF SLAVE DEVICES

(71) Applicant: Fujitsu Client Computing Limited, Kanagawa (JP)

(72) Inventor: Shigeo Sakuma, Yokohama (JP)

(73) Assignee: Fujitsu Client Computing Limited, Kanagawa (JP)

( * ) Notice: Subject to any disclaimer, the term of this patent is extended or adjusted under 35 U.S.C. 154(b) by 67 days.

(21) Appl. No.: 15/358,801

(22) Filed: Nov. 22, 2016

(65) Prior Publication Data
US 2017/0185548 A1    Jun. 29, 2017

(30) Foreign Application Priority Data

Dec. 25, 2015  (JP) ................................ 2015-252754

(51) Int. Cl.
| | | |
|---|---|---|
| G06F 13/00 | (2006.01) | |
| G06F 13/36 | (2006.01) | |
| G06F 13/40 | (2006.01) | |
| G06F 13/42 | (2006.01) | |

(52) U.S. Cl.
CPC .......... *G06F 13/36* (2013.01); *G06F 13/4068* (2013.01); *G06F 13/4282* (2013.01)

(58) Field of Classification Search
CPC ... G06F 13/36; G06F 13/4282; G06F 13/4068
See application file for complete search history.

(56) References Cited

U.S. PATENT DOCUMENTS

| | | | | |
|---|---|---|---|---|
| 5,754,780 | A * | 5/1998 | Asakawa | G05B 15/02 700/3 |
| 7,747,804 | B2 * | 6/2010 | Wang | H04L 12/403 710/105 |
| 8,856,413 | B2 * | 10/2014 | Schultz | G05B 19/4185 710/104 |
| 9,760,322 | B2 * | 9/2017 | Hamada | G06F 3/1236 |
| 2008/0288919 | A1 * | 11/2008 | Hodges | G06F 8/423 717/106 |
| 2011/0078350 | A1 * | 3/2011 | Carls | G06F 1/04 710/110 |
| 2012/0072628 | A1 * | 3/2012 | Crockett | G06F 13/4291 710/110 |
| 2013/0297829 | A1 * | 11/2013 | Berenbaum | G06F 13/4256 710/3 |

(Continued)

FOREIGN PATENT DOCUMENTS

JP    05-265948    10/1993

*Primary Examiner* — Jing-Yih Shyu
(74) *Attorney, Agent, or Firm* — Osha Liang LLP

(57) ABSTRACT

A transmission system includes: a master device; and a plurality of slave devices including a first slave device and a second slave device, each of the plurality of slave devices having its own identifier. The master device includes a processor configured to: transmit a control signal of a clock length that the first slave device does not respond to, to the plurality of slave devices at a first timing; and transmit an identifier that identifies the second slave device to the plurality of slave devices at a second timing after the first timing. The second slave device transmits data to the master device when the second slave device receives the control signal and the identifier that identifies the second slave device.

7 Claims, 24 Drawing Sheets

(56) References Cited

U.S. PATENT DOCUMENTS

2017/0083467 A1* 3/2017 Mishra ................. G06F 13/362
2017/0177538 A1* 6/2017 Jiang .................. G06F 13/4213
2017/0235692 A1* 8/2017 Ahamed ............... G06F 1/3243
710/308

* cited by examiner

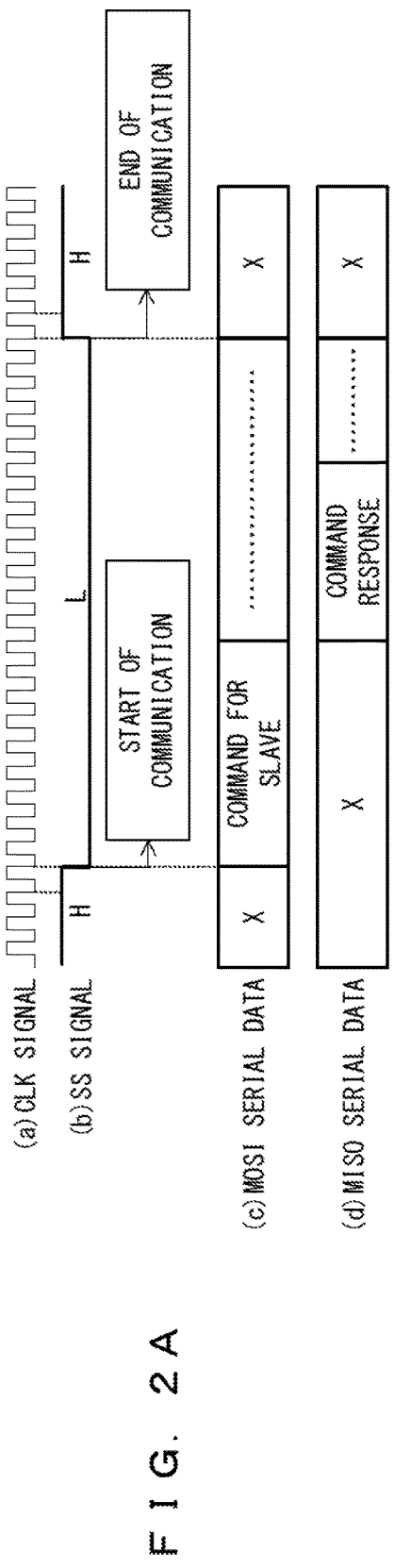
F I G. 2A
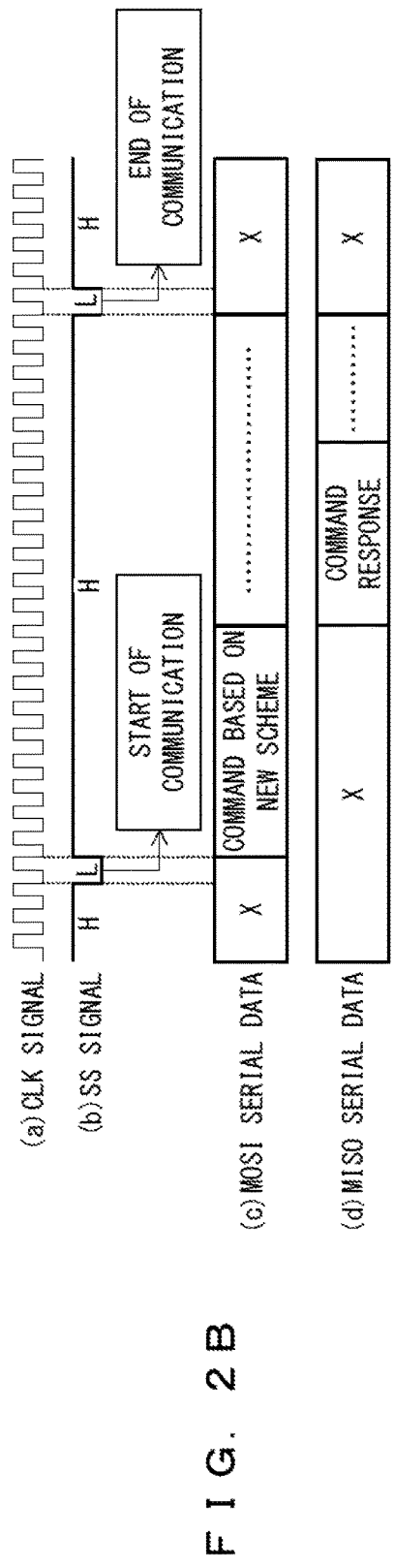
F I G. 2B

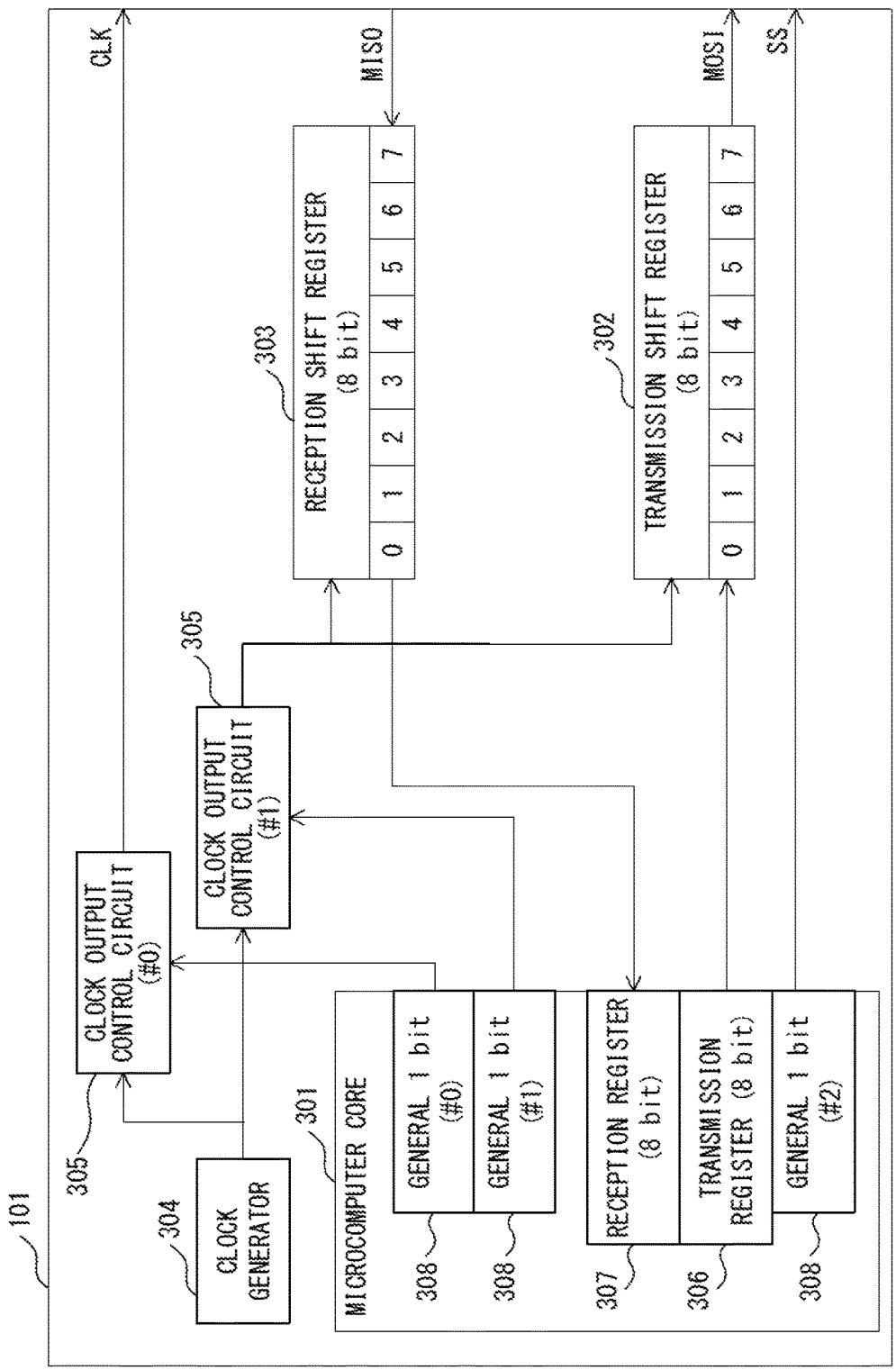
F I G. 3

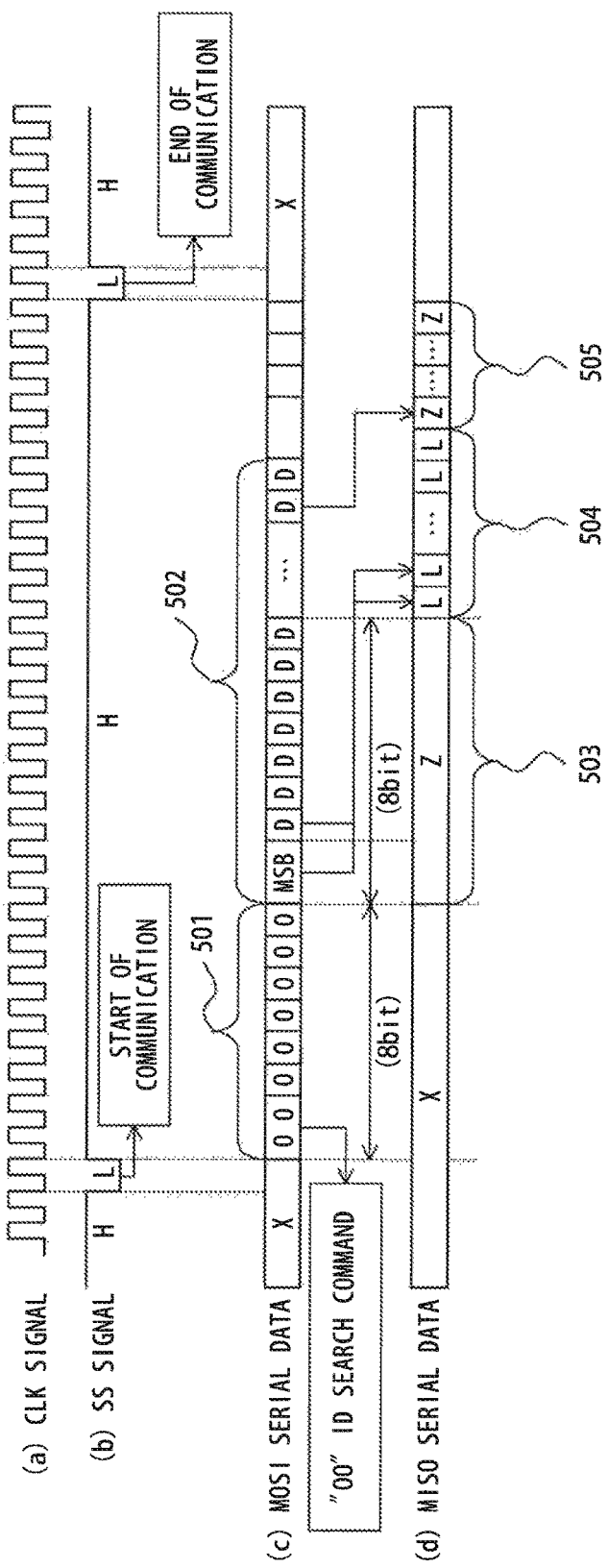
F I G. 5

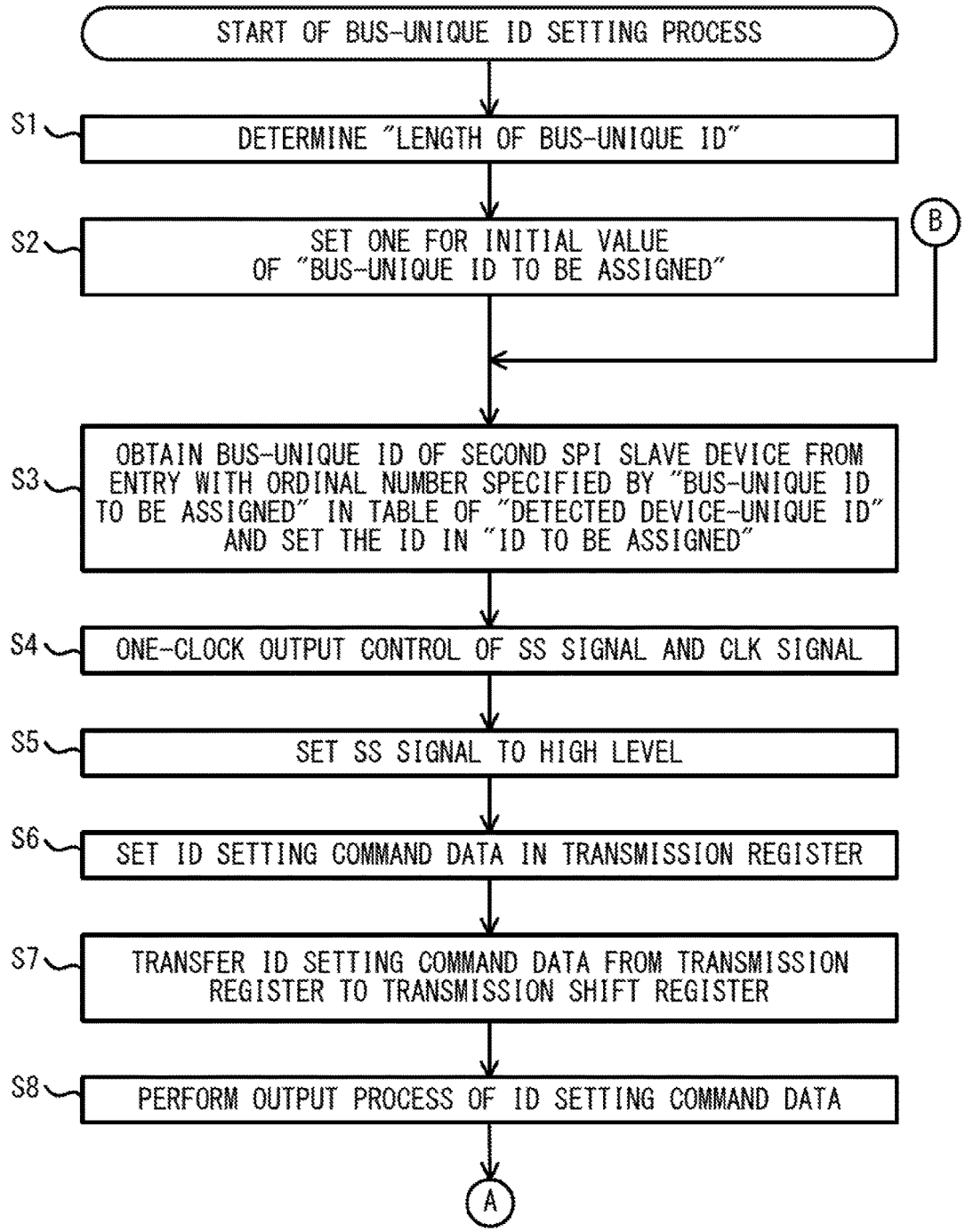
F I G. 16

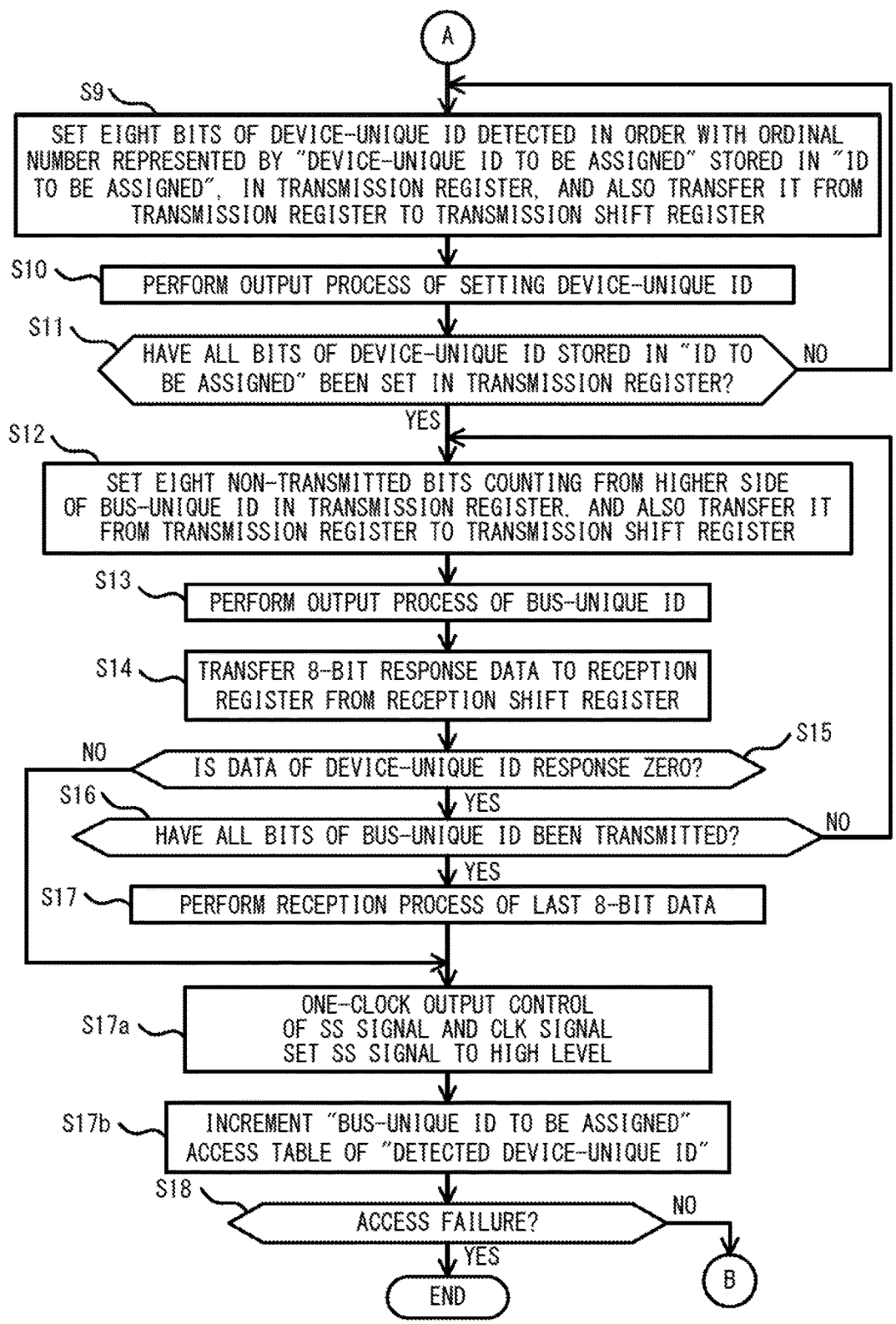
F I G. 17

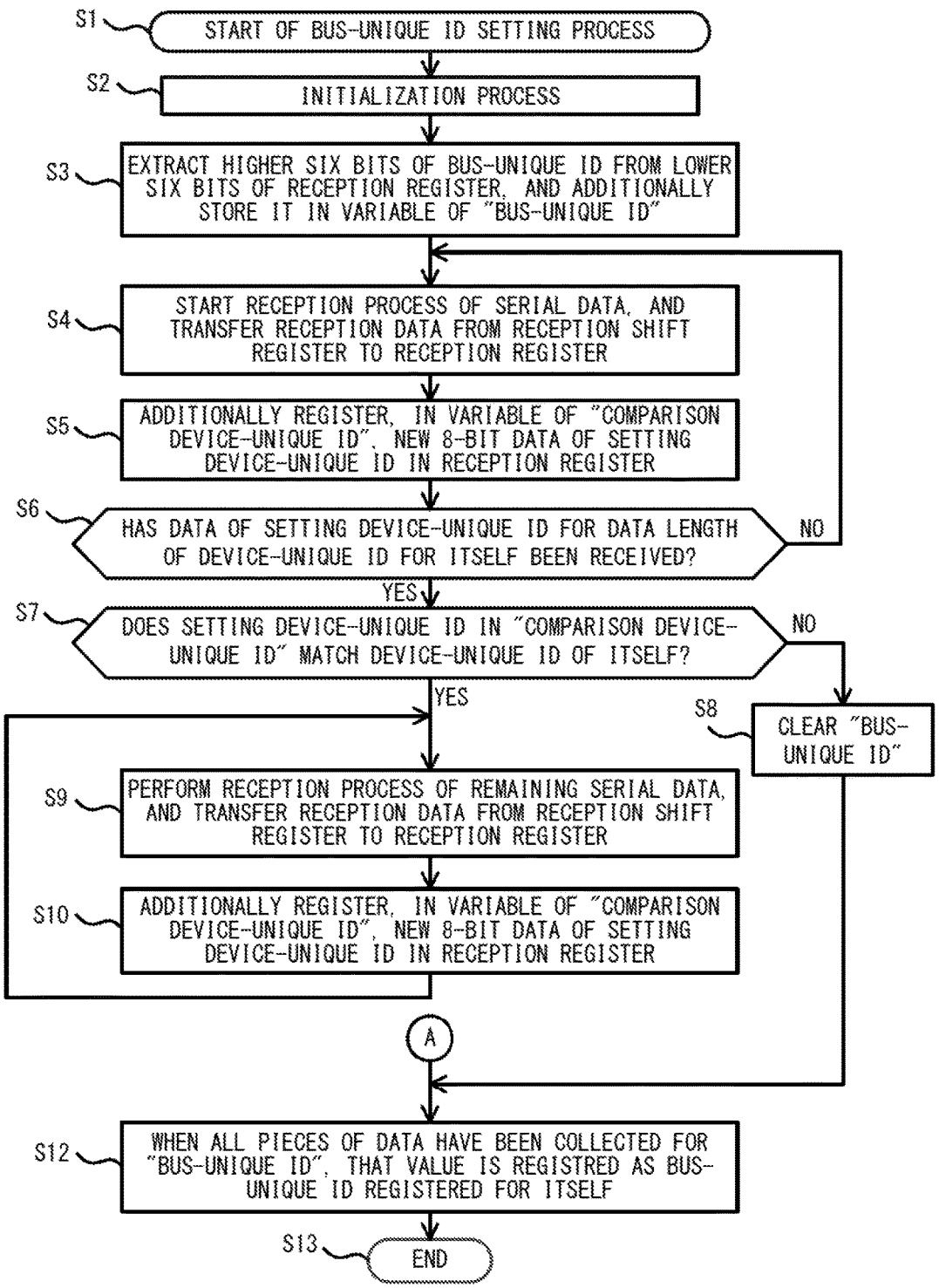
F I G. 2 2

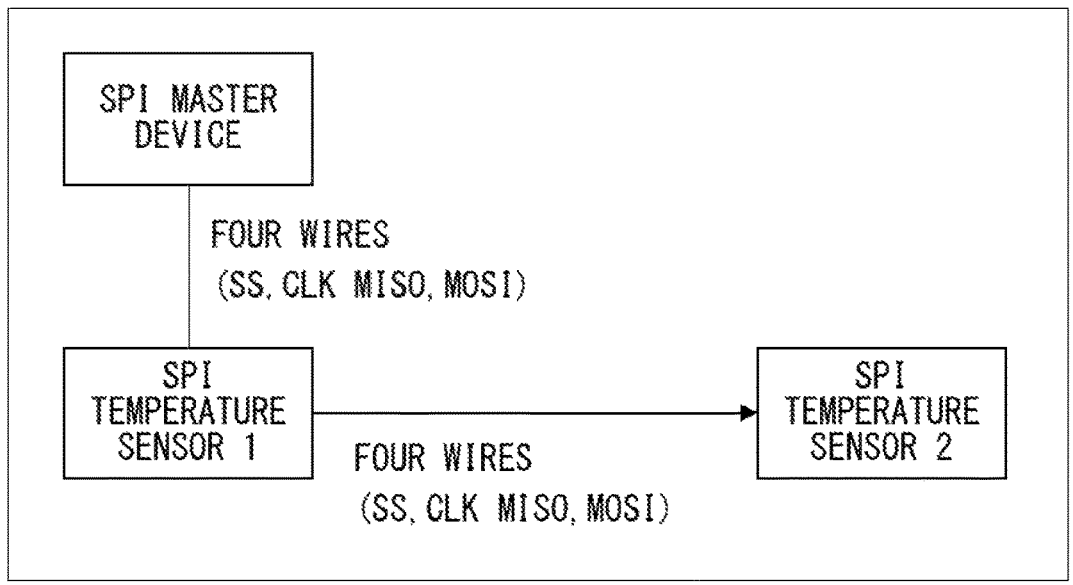
F I G. 2 3

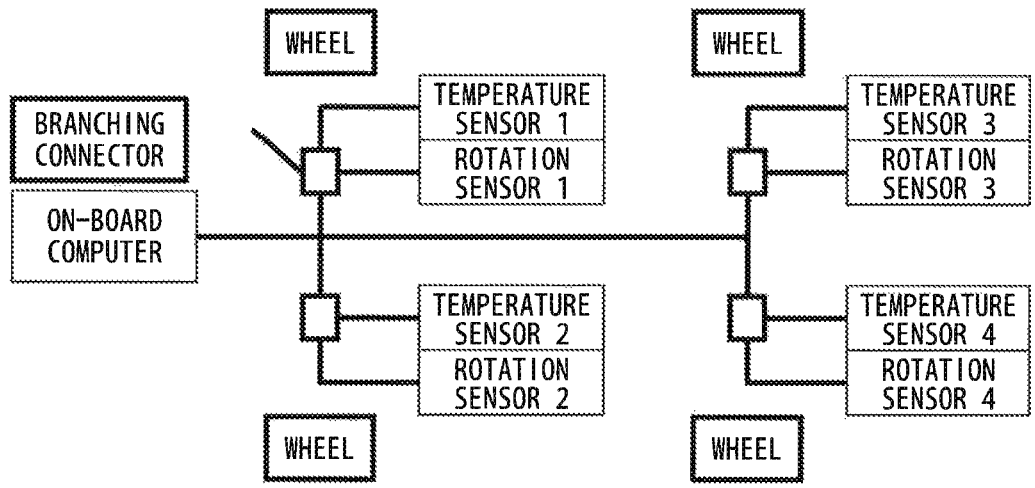
F I G. 24A
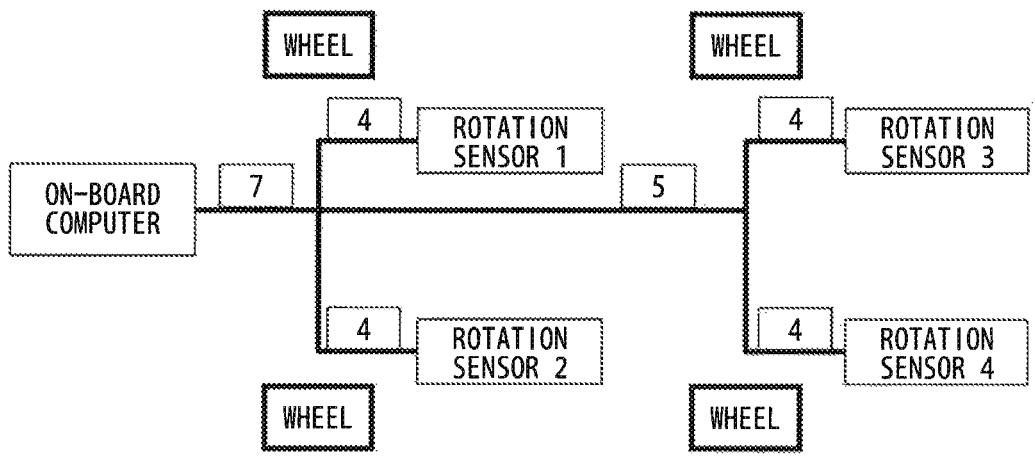
F I G. 24B
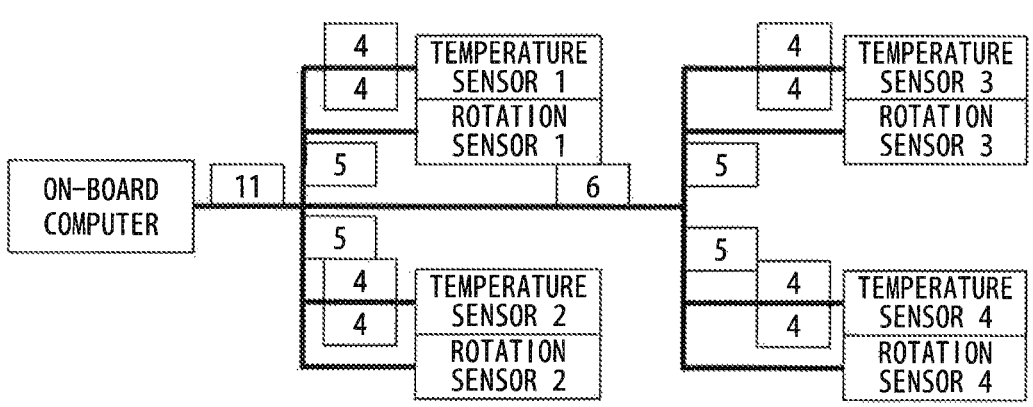
F I G. 24C

TRANSMISSION SYSTEM THAT INCLUDES MASTER DEVICE AND A PLURALITY OF SLAVE DEVICES

CROSS-REFERENCE TO RELATED APPLICATION

This application is based upon and claims the benefit of priority of the prior Japanese Patent Application No. 2015-252754, filed on Dec. 25, 2015, the entire contents of which are incorporated herein by reference.

FIELD

The embodiments discussed herein are related to a transmission system that includes a master device and a plurality of slave devices connected to the master device.

BACKGROUND

SPI (Serial Peripheral Interface), MicroWire, I²C, CAN (Controller Area Network), etc. are known as a serial bus often used for personal computers or used in an embedded form. These serial busses are used for connecting peripherals such as for example EEPROMs (Electrically Erasable Programmable Read Only Memories), various types of sensors, input/output controllers, D/A controllers, A/D converters, etc.

When a slave device of a peripheral is to be added to the serial bus of the master device, a slave select signal line (referred to as an "SS (Slave Select) signal line" hereinafter) will generally be added to the master device in a one-to-one connection. This has led to major alterations both in hardware and software. An example of this is a case where when an SPI master device has a first SPI temperature sensor at one board terminal portion of the SPI master device, it is desired that a second SPI temperature sensor be added to another board terminal portion. In the case of SPI, an SS signal line from the SPI master device has to be added newly so that the signal line is connected to the second SPI temperature sensor, which sometimes leads to major design alterations.

Also, in some cases, when it is desired that what kind of slave devices are connected to the master device be detected, it is not possible to find reliably that there are no slave devices because conventional SPI for example is not provided with a function to find a presence or absence of slave devices. When for example master devices, each without a temperature sensor, with one temperature sensor, and with two temperature sensors, are prepared as product configurations, a function that announces each configuration has to be used separately from SPI. Also, software to be embedded has to be prepared for each product configuration and hardware has to be added for announcing the configuration.

As a conventional technique for adding a slave device without adding an SS signal line to the master device, a slave device that can have an ID (identifier) of about two bits is known.

The following technique is also known. A common bus is configured of four lines, i.e., a clock transmission line, a first data transmission line for transmitting data from the master device to a slave device, a second data transmission line for transmitting data from a slave device to the master device and a control signal transmission line. In the above configuration, the device operating as the master device sends a data string containing the device address and serial data of the slave device to which the data is to be transmitted, together with the control signal and the clock signal. A device having the address identical to the received device address operates as a slave device and returns the received data to the master device. Then, receiving the data that was received and returned by the slave device, the master device confirms the operations of the slave device and sends the end-function code in the last portion of a data string (Japanese Laid-open Patent publication No. 05-265948 for example).

However, in the conventional technique of a slave device that can have an ID of about two bits, the number of slave devices of the same type that can be added in parallel depends upon the number of setting pins of the master device, and the number of slave devices that can be added in parallel ranges from four to eight at most.

Also, there is a risk that the slave device disclosed by Patent Document 1, when it is used together with a general SPI slave device, will malfunction upon the transmission, from the master device, of commands indicating the start and end of communications. This sometimes prevents the above conventional slave device from being used together with a general SPI slave device.

SUMMARY

According to an aspect of the present invention, a transmission system includes: a master device; and a plurality of slave devices including a first slave device and a second slave device, each of the plurality of slave devices having its own identifier. The master device includes a processor configured to: transmit a control signal to the plurality of slave devices at a first timing, a length of the control signal being determined such that the first slave device does not respond to the control signal; and transmit an identifier that identifies the second slave device to the plurality of slave devices at a second timing after the first timing. The second slave device transmits data to the master device when the second slave device receives the control signal and the identifier that identifies the second slave device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A and FIG. 2B are timing charts illustrating examples of operations of the transmission system;

FIG. 3 is a block diagram illustrating a configuration example of the SPI master device illustrated in FIG. 1;

FIG. 5 is a timing chart illustrating an example of a device-unique ID searching process and a device-unique ID response process;

FIG. 16 and FIG. 17 are flowcharts explaining a detailed example of a bus-unique ID setting process;

FIG. 22 is a flowchart explaining a detailed example of a bus-unique ID setting process;

FIG. 23 illustrates a configuration example of the transmission system in a personal computer main board; and FIGS. 24A-24C illustrate a configuration example of the transmission system in an on-board system.

DESCRIPTION OF EMBODIMENTS

Figure 1:
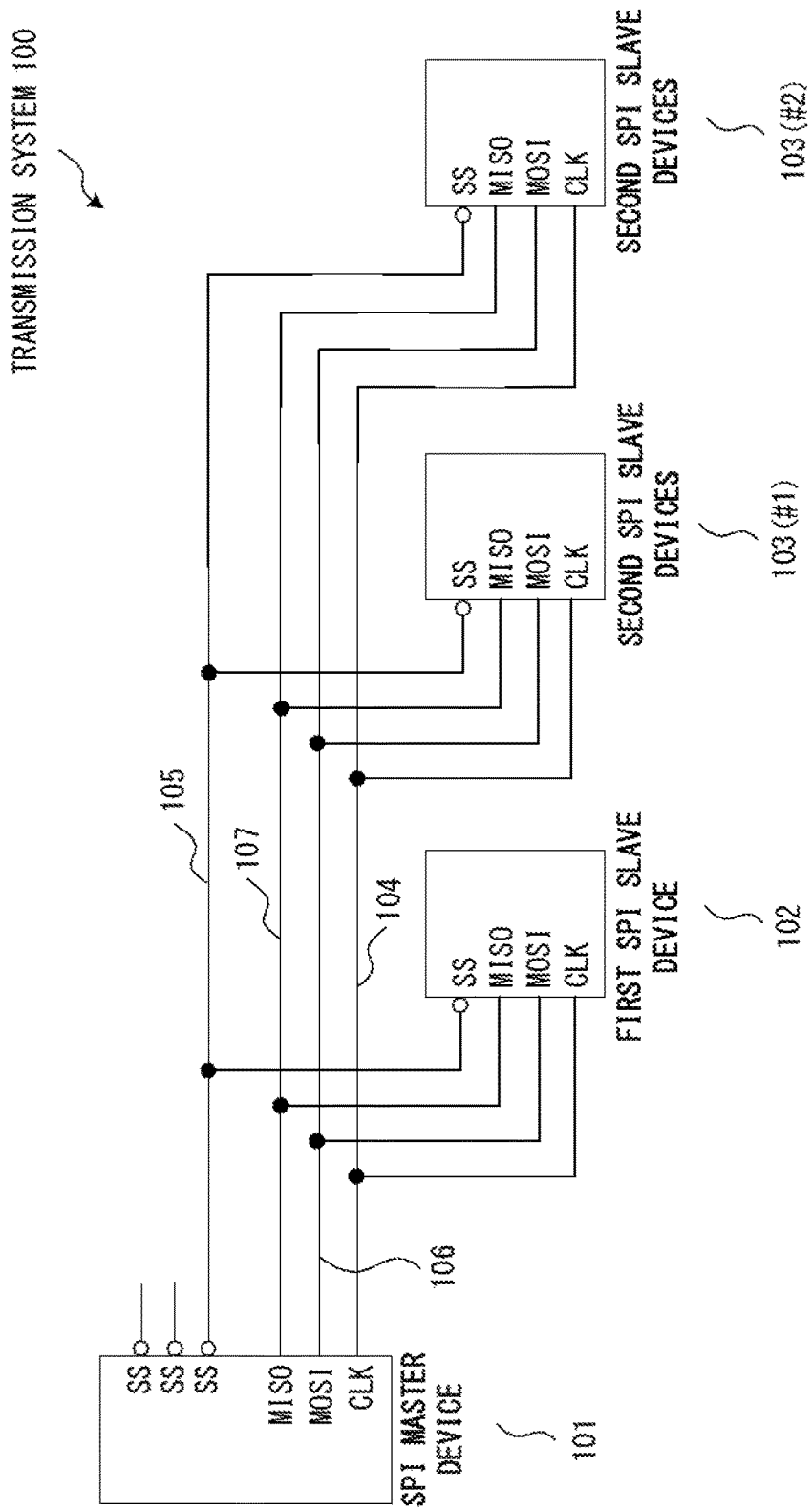
FIG. 1 illustrates a configuration example of an embodiment of a transmission system in which an SPI master device and slave devices are connected.

Hereinafter, detailed explanations will be given for the embodiments of the present invention by referring to the drawings. FIG. 1 illustrates a configuration example of an embodiment of a transmission system 100 in which an SPI master device and slave devices are connected. The transmission system 100 in the present embodiment employs an SPI serial bus scheme, and includes an SPI master device 101 (master device), which serves as the master device. Also, the transmission system 100 includes a first SPI slave device 102 (first slave device), which serves as a slave device that communicates with the SPI master device 101 by a general SPI serial bus scheme (referred to as a "general scheme" hereinafter). Further, the transmission system 100 includes second SPI slave devices 103 (second slave devices), which serve as slave devices that communicate with the SPI master device 101 by the extendable scheme that is proposed by the present embodiment (referred to as the "extended scheme" hereinafter).

The transmission system 100 includes a CLK signal line 104 (clock signal line) that transmits a clock signal. The CLK signal line 104 is connected to the CLK terminal of the SPI master device 101, the first SPI slave device 102, and the second SPI slave device 103. In the explanations below, a clock signal transmitted through the CLK signal line 104 is referred to as a CLK signal.

Also, the transmission system 100 includes an SS signal line 105 (slave select signal line). The SS signal line 105 is connected to the SS terminal of the SPI master device 101, the first SPI slave device 102, and the second SPI slave device 103. In the explanations below, a slave select signal transmitted through the SS signal line 105 is referred to as an SS signal.

Further, the transmission system 100 includes a MOSI signal line 106 (master output slave input signal line) that transmits serial data from the SPI master device 101 to the first SPI slave device 102 and/or the second SPI slave device 103. The MOSI signal line 106 is connected to the MOSI terminal of the SPI master device 101, the first SPI slave device 102, and the second SPI slave device 103. In the explanations below, serial data transmitted through the MOSI signal line 106 is referred to as MOSI serial data.

In addition, the transmission system 100 includes a MISO signal line 107 (master input slave output signal line) that transmits serial data to the SPI master device 101 from the first SPI slave device 102 and/or the second SPI slave device 103. The MISO signal line 107 is connected to the MISO terminal of the SPI master device 101, the first SPI slave device 102, and the second SPI slave device 103. In the explanations below, serial data transmitted through the MISO signal line 107 is referred to as MISO serial data.

The present embodiment explained below will use an SPI serial bus scheme as an example; however, the present embodiment can easily be applied also to MicroWire, which employs similar communication scheme.

FIG. 2A and FIG. 2B are timing charts illustrating the examples of the operations of the transmission system 100 illustrated in FIG. 1. FIG. 2A is a timing chart example for a case when the first SPI slave device 102 operating according to a general scheme conducts an SPI communication with the SPI master device 101. FIG. 2B is a timing chart example for a case when the second SPI slave device 103 operating according to the extended scheme conducts an SPI communication with the SPI master device 101. In these timing charts, "H" represents a high-level logical state, while "L" represents a low-level logical state. "X" indicates that a state is not taken into consideration.

In FIG. 2A, the SPI master device 101, when starting a communication with the first SPI slave device 102 based on a general scheme, changes the SS signal from a high level to a low level in synchronization with a CLK signal. Then, the SPI master device 101 transmits command data to the first SPI slave device 102 via the MOSI signal line 106 as MOSI serial data. In response to the SS signal having become a low level, the first SPI slave device 102 enters a state in which it receives serial data on the MOSI signal line 106 so as to receive command data. In response to this command data, the first SPI slave device 102 transmits command response data as MISO serial data through the MISO signal line 107. By repeating the transmission and reception of command data and command response data as described above, the SPI master device 101 and the first SPI slave device 102 conduct communications. When terminating a communication with the first SPI slave device 102 based on a general scheme, the SPI master device 101 returns the SS signal from a low level to a high level in synchronization with the CLK signal.

In FIG. 2B, the SPI master device 101, when starting a communication with the second SPI slave device 103 operating on the extended scheme, performs the following control as a first transmission unit. At a first timing, the SPI master device 101 transmits an SS signal, which is a control signal having a clock length that does not cause the first SPI slave device 102 to make a response. Specifically, the SPI master device 101 controls the SS signal in the first logical state or at a low level for the length of one clock of a CLK signal so as to start a communication, and thereafter returns the SS signal to the second logical state or a high level at the subsequent second timing so as to keep a communication period. As the second transmission unit, the SPI master device 101 transmits a command, as MOSI serial data, on an extended scheme including an identifier that identifies the second SPI slave device 103 that operates based on the extended scheme in a communication period of the second timing in the second logical state. Receiving the above control signal, i.e., the SS signal that is in the first logical state for the length of one clock, the second SPI slave device 103 recognizes the start of the communication, and enters a state in which it can communicate with the SPI master device 101 in a communication period of the second timing at which the SS signal subsequently enters the second logical state. In that state, when receiving a command containing an identifier identifying the second SPI slave device 103 itself, the second SPI slave device 103 as the third transmission unit transmits a command response to the SPI master device 101 as MISO serial data in response to the received command. By repeating the transmission and reception of command data and command response data in the communication period of the above second timing as described above, the SPI master device 101 and the second SPI slave device 103 conduct communications. When terminating a communication with the second SPI slave device 103 operating on the extended scheme, the SPI master device 101 again controls the SS signal in the first logical state or at the low level for the length of one clock of the CLK signal in synchronization with the CLK signal so as to terminate the communication. Thereafter, the SPI master device 101 returns the SS signal to the second logical state or a high level.

By the above control operations, the following basic operations 1 through 3 are conducted in the present embodiment.

Basic Operation 1

As illustrated in FIG. 2B, the SPI master device 101 can communicate with a plurality of second SPI slave devices 103 that operate on the extended schemes even when the SS signal remains at a high level after the second timing that is subsequent to the activation of the SS signal for one clock. Because the second SPI slave device 103 is not identified by the SS signal line 105, the second SPI slave device 103 that operates on the extended scheme by sharing an SS signal can be added. In the example illustrated in FIG. 1, two second SPI slave devices 103 (#1 and #2) are connected through one SS signal line 105. Because there are no strict definitions for the communication protocol of SPI, simply sharing an SS signal leads to a risk that a slave device other than the target slave device will make a response. The second SPI slave device 103 that is added in the present embodiment can regard the first timing at which an SS signal enters the first logical state for the length of one clock, as the start and termination of a communication based on the communication protocol of the extended scheme. In the above situation, the first SPI slave device 102 based on a general scheme can prevent itself from responding to the communication protocol based on the extended scheme because communications of SPI are conducted in units of eight bits. Further, as illustrated in FIG. 2B, the SPI master device 101 and the second SPI slave device 103 conduct all communications in a communication period with the SS signal in the second logical state or at a high level, except at the first timing. This makes it possible to use an SS signal based on the extended scheme together with an SS signal based on a general scheme for the first SPI slave device 102 that is selected in response to the SS signal becoming a low level. In other words, one SS signal line 105 connected to one SS terminal of the SPI master device 101 is connected to an SS terminal of the first SPI slave device 102 based on a general scheme, and is also connected to an SS terminal of the second SPI slave device 103 that operates on the extended scheme. As described above, the present embodiment makes it possible to realize a coexistence of an SPI communication conducted by the first SPI slave device 102 based on a general scheme and an SPI communication conducted by the second SPI slave device 103 operating on the extended scheme without causing interference.

Basic Operation 2

For the second SPI slave device 103 operating on the extended scheme, a unique ID (identifier) is set, and the SPI master device 101 searches for that ID so as to register it in advance. In a serial bus communication based on the extended scheme, the SPI master device 101 can use this registered ID so as to identify the second SPI slave device 103 in order to communicate with it. Hereinafter, this ID is referred to as a device-unique ID (device-unique identifier). This device-unique ID is unique among all the second SPI slave devices 103, and no second SPI slave devices 103 share the same device-unique ID. This device-unique ID has a data length that is common for all the second SPI slave devices 103. In the present embodiment, this device-unique ID is searched for in order to find accurately how many second SPI slave devices 103 that share an SS signal are connected to the SPI master device 101.

Basic Operation 3

Device-unique IDs have a sufficient data length for example ranging from 48 bits to 64 bits so that all the second SPI slave devices 103 are treated in a unique manner. As described above, because device-unique IDs have a great data length, when they are used for SPI communications as they are, there is a possibility that the communication speed will be influenced. In view of the above, the SPI master device 101 can assign, to each second SPI slave device 103, an ID with a data length shorter than the data length of a device-unique ID, separately from the above device-unique ID. Hereinafter, this ID is referred to as a bus-unique ID (bus-unique IDentifier). By using a bus-unique ID instead for a device-unique ID for identifying the second SPI slave device 103 for indicating a communication target device, the SPI master device 101 can suppress influences on the communication speed. In the transmission system 100 illustrated in FIG. 1, the data length of a bus-unique ID can be determined in accordance with the number of the second SPI slave devices 103 that are connected to the SPI master device 101. When this number is about several tens for example, six bits is sufficient for the data length of a bus-unique ID. Note that in the present embodiment, a bus-unique ID is specified only once at the start of a communication with one second SPI slave device 103, and the SPI master device 101 and the second SPI slave device 103 can conduct SPI communications thereafter. This can minimize the influence of the specifying of bus-unique IDs on the communication speed. In the above situation, other second SPI slave devices 103 may be controlled so that they do not conduct SPI communications before a new bus-unique ID is specified.

As described in basic operations 1-3 above, instead of depending upon an SS signal alone, the second SPI slave devices 103 are identified by the SPI master device 101 based on the device-unique ID and the bus-unique ID at the second timing subsequent to the activation of an SS signal for one clock. According to the present embodiment, this permits flexible addition of the second SPI slave device 103 even without the addition of the SS signal line 105.

FIG. 3 is a block diagram illustrating a configuration example of the SPI master device 101 illustrated in FIG. 1. The SPI master device 101 includes a microcomputer core 301, a transmission shift register 302, a reception shift register 303, a clock generator 304 and clock output control circuits 305 (#0 and #1). The microcomputer core 301 includes a transmission register 306, a reception register 307, and general-purpose one-bit registers (#0 through #2) 308, which appear as "GENERAL 1 bit" in the figure.

The microcomputer core 301 includes devices such as registers of 306-308 in addition to general elements of a computer that has a CPU (central processing unit), a ROM (read only memory), a RAM (random access memory), etc., although these elements are not illustrated.

The transmission register 306 temporarily holds 8-bit data that is to be set in the transmission shift register 302. After 8-bit data is set by the transmission register 306, the transmission shift register 302 sequentially outputs serial data through the MOSI terminal in accordance with a CLK signal output from the clock output control circuit 305 (#1).

In accordance with a CLK signal output from the clock output control circuit 305 (#1), the reception shift register 303 sequentially receives the serial data received through the MISO terminal. After the serial 8-bit data is input to the reception shift register 303, the reception register 307 temporarily holds that 8-bit data.

Each time a value of "1" is set, the general-purpose one-bit registers 308 (#0 and #1) operate the clock output control circuits 305 (#0 and #1), respectively. While a value of "1" is set in the general-purpose one-bit register 308 (#0), the clock output control circuit 305 (#0) outputs, through a CLK terminal, a CLK signal that is output from the clock generator 304. While a value of "1" is set in the general-purpose one-bit register 308 (#1), the clock output control circuit 305 (#1) supplies the transmission shift register 302 and the reception shift register 303 with a CLK signal output from the clock generator 304 so as to cause a shift operation in synchronization with this CLK signal.

Figure 4:
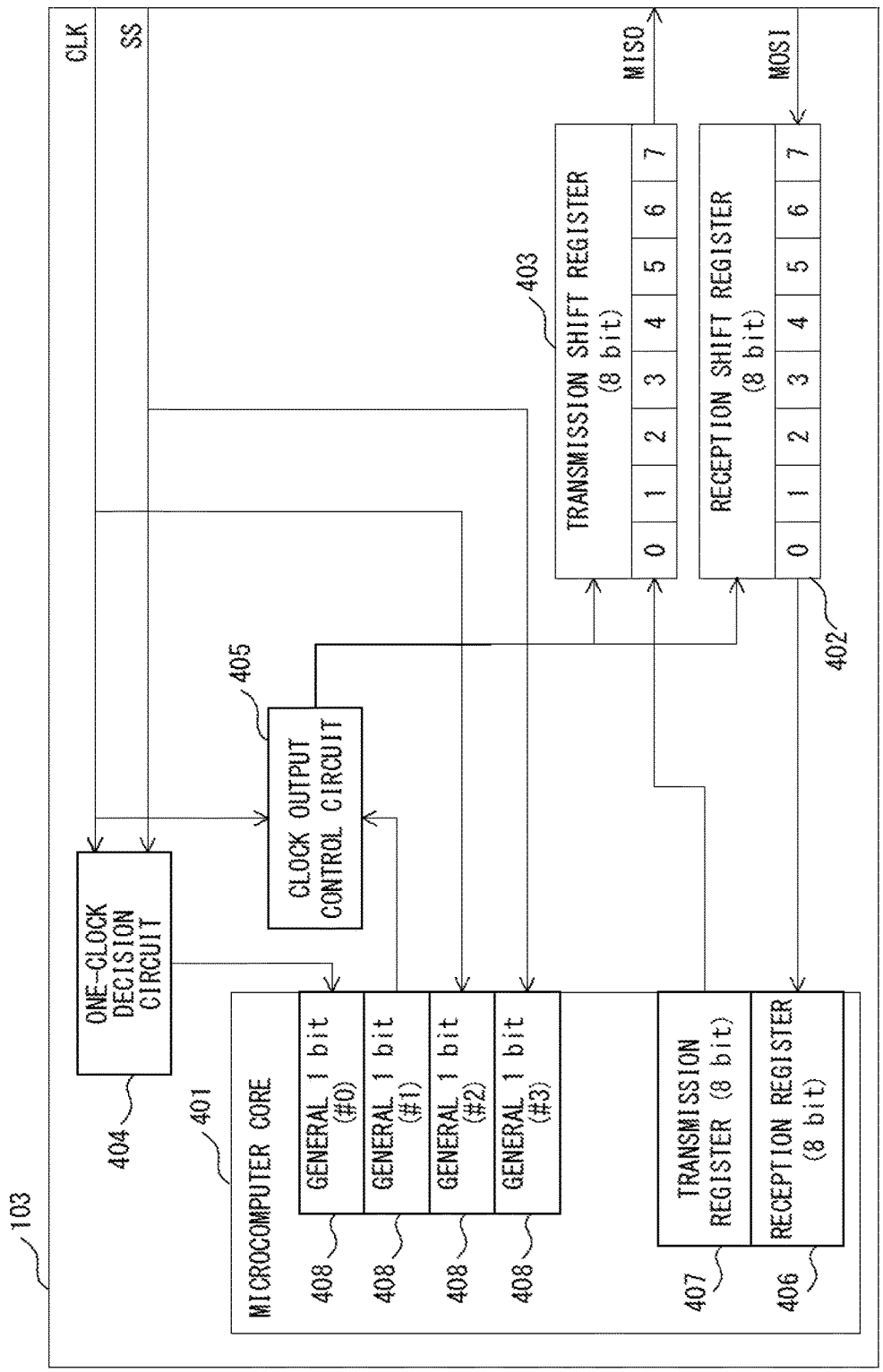
FIG. 4 is a block diagram illustrating a configuration example of a second SPI slave device illustrated in FIG. 1.

FIG. 4 is a block diagram illustrating a configuration example of the second SPI slave device 103 illustrated in FIG. 1. The second SPI slave device 103 includes a microcomputer core 401, a reception shift register 402, a transmission shift register 403, a one-clock decision circuit 404 and a clock output control circuit 405. The microcomputer core 401 includes a reception register 406, a transmission register 407, and general-purpose one-bit registers (#0 through #3) 408, which appear as "GENERAL 1 bit" in the figure.

The microcomputer core 401 includes the registers 406-408 in addition to general elements of a computer that has a CPU, a ROM, a RAM, etc., although these elements are not illustrated.

The transmission register 407 temporarily holds 8-bit data to be set in the transmission shift register 403. After 8-bit data is set by the transmission register 407, the transmission shift register 403 sequentially transmits serial data through the MOSI terminal in accordance with a CLK signal output from the clock output control circuit 405.

In accordance with a CLK signal output from the clock output control circuit 405, the reception shift register 402 sequentially receives the serial data received through the MISO terminal. After the serial 8-bit data is input to the reception shift register 402, the reception register 406 temporarily holds that 8-bit data.

Based on an SS signal received through the SS terminal and a CLK signal received through the CLK terminal, the one-clock decision circuit 404 decides whether or not the SS signal has become a low level for the length of one clock.

The general-purpose one-bit register 408 (#0) holds output from the one-clock decision circuit 404.

In response to the setting of a value of "1", the general-purpose one-bit register 408 (#1) operates the clock output control circuit 405. While a value of "1" is set in the general-purpose one-bit register 408 (#1), the clock output control circuit 405 outputs a CLK signal that is in synchronization with a CLK signal input through the CLK terminal. This CLK signal is supplied to the transmission shift register 403 and the reception shift register 402 so as to cause a shift operation in synchronization with this CLK signal.

The general-purpose one-bit register 408 (#2) holds a CLK signal input through the CLK terminal. The general-purpose one-bit register 408 (#3) holds an SS signal input through the SS terminal.

FIG. 5 is a timing chart illustrating an example of a device-unique ID searching process performed by the SPI master device 101 and a device-unique ID response process performed by the second SPI slave device 103. These processes enable the SPI master device 101 to recognize which device-unique ID is used by which of the second SPI slave devices 103. The SPI master device 101 inquires of the second SPI slave device 103 in the period between the start and termination of the communication while sequentially incrementing a candidate value for a device-unique ID of a prescribed number of bits (such as about 48 through 64 bits) starting from a state in which all the bits are zero. The SPI master device 101 registers a candidate value for a device-unique ID to which one of the second SPI slave devices 103 made a response, as a device-unique ID that is being used. Hereinafter, the flows of a device-unique ID searching process and a device-unique ID response process will be explained.

Operation 1 of SPI Master Device 101

As explained in FIG. 2B, the SPI master device 101 controls the SS signal of FIG. 5 output through the SS terminal of FIG. 3 in the first logical state or at a low level for the length of one clock that is in synchronization with the CLK signal of FIG. 5 output through the CLK terminal of FIG. 3. Thereafter, the SPI master device 101 returns the SS signal to the second logical state or a high level. That moment is treated as the start of the communication between the SPI master device 101 and the second SPI slave device 103. This control is performed mainly by using the general-purpose one-bit registers 308 (#0 and #1) in the microcomputer core 301 and the clock output control circuit 305 (#0) illustrated in FIG. 3.

Operation 2 of SPI Master Device 101

After the start of the communication, the SPI master device 101 conducts the following operations in the communication period of the second timing at which the SS signal was made to become a high level. The SPI master device 101 generates 8-bit serial data 501 in which "00" is set in the first two bits counting from the MSB as an ID search command (identifier search command) and "000000" is embedded in the lower six bits. The SPI master device 101 synchronizes this serial data 501 with the CLK signal of FIG. 5 output through the CLK terminal of FIG. 3, and outputs the data through the MOSI terminal of FIG. 3 as the MOSI serial data of FIG. 5. This control is performed mainly by using the transmission register 306, the transmission shift register 302 and the clock output control circuits 305 (#0 and #1) illustrated in FIG. 3.

Operation 3 of SPI Master Device 101

Subsequently to the transmission of the serial data 501, the SPI master device 101 conducts the following operations in the communication period after the start of the communication. The SPI master device 101 synchronizes serial data 502 corresponding to the searching device-unique ID with the CLK signal of FIG. 5 output through the CLK terminal of FIG. 3 and sequentially transmits the data through the MOSI terminal of FIG. 3 as the MOSI serial data of FIG. 5. For the above operation, the SPI master device 101 uses the transmission register 306 and the transmission shift register 302 illustrated in FIG. 3 so as to transmit a searching device-unique ID having a data length of for example from 48 bits through 64 bits as the serial data 502 that has been segmented in units of eight bits starting from the MSB. This control is performed mainly by using the transmission register 306, the transmission shift register 302, and the clock output control circuits 305 (#0 and #1) illustrated in FIG. 3. Note that this transmission may be conducted sequentially from the LSB (Least Significant Bit) instead of the MSB.

Operation 1 of Second SPI Slave Device 103

In parallel to <Operation 1 of SPI master device 101>, the second SPI slave device 103 detects the SS signal of FIG. 5 input through the SS terminal of FIG. 4, the SS signal having been at a low level for the length of one clock of the CLK signal of FIG. 5 input through the CLK terminal of FIG. 4. Thereby, the second SPI slave device 103 enters a state in which it starts a communication. This control is performed mainly by using the one-clock decision circuit 404 and the general-purpose one-bit register 408 (#1) illustrated in FIG. 4.

Operation 2 of Second SPI Slave Device 103

In the communication period after the above start of the communication, the second SPI slave device 103 conducts the following operations in synchronization with the CLK signal of FIG. 5 input through the CLK terminal of FIG. 4. The second SPI slave device 103 receives "00" as the ID search command in the two bits counting from the MSB and "000000" in the lower six bits, as the serial data 501 of the first eight bits that is input as the MOSI serial data of FIG. 5 through the MOSI terminal of FIG. 4. This control is performed mainly by using the general-purpose one-bit register 408 (#1), the clock output control circuit 405, the reception shift register 402 and the reception register 406 illustrated in FIG. 4. After recognizing this ID search command, the second SPI slave device 103 switches the MISO serial data of FIG. 5 output through the MISO terminal of FIG. 4 to an open drain output 503 in a logical state of "Z". Thereafter, the second SPI slave device 103 performs a device-unique ID response process. This logical state of "Z" indicates that the MISO terminals of all the second SPI slave devices 103 that were connected to the SPI master device 101 are in an open drain state (a high impedance state). In this state, it seems to the SPI master device 101 that the logical state of the MISO terminal of FIG. 3 is "H" (high level).

Operation 3 of Second SPI Slave Device 103

In a device-unique ID response process, the second SPI slave device 103 conducts the following operations in synchronization with the CLK signal of FIG. 5 input through the CLK terminal of FIG. 4. The second SPI slave device 103 sequentially compares the serial data 502 of the searching device-unique ID that is sequentially input as the MOSI serial data of FIG. 5 through the MOSI terminal of FIG. 4, with the data in each bit starting from the MSB of the device-unique ID of the second SPI slave device 103 itself. This control is performed mainly by using the general-purpose one-bit register 408 (#1), the clock output control circuit 405, the reception shift register 402 and the reception register 406 illustrated in FIG. 4. As a result of this comparison, the second SPI slave device 103 transmits the following serial data 504 or 505 as the MISO serial data of FIG. 5 through the MISO terminal of FIG. 4 in synchronization with the CLK signal of FIG. 5 input through the CLK terminal of FIG. 4. When a correspondence is detected as a result of the comparison, the second SPI slave device 103 transmits the serial data 504 of the device-unique ID response that enters a logical state of "L" at the timing corresponding to the bit position at which the correspondence was detected. In the above transmission, the second SPI slave device 103 transmits the serial data 504 of the device-unique ID response in units of eight bits corresponding to the searching device-unique ID that is input in units of eight bits via the reception shift register 402 and the reception register 406 illustrated in FIG. 4. This control is performed mainly by using the transmission register 407, the transmission shift register 403 and the clock output control circuit 405 illustrated in FIG. 4. When a correspondence as a result of the comparison stops being detected, the second SPI slave device 103 makes the MISO terminal of FIG. 4 an open drain so as to make it enter a high impedance state, and thereafter refrains from performing comparisons of the IDs.

Operation 4 of SPI Master Device 101

During the communication period after the start of the communication, the SPI master device 101 verifies the value of the serial data 504 (FIG. 5) of the device-unique ID response that is input in units of eight bits through the MISO terminal illustrated in FIG. 4. This serial data 504 of the device-unique ID response in units of eight bits is response data for the serial data 502 (FIG. 5) of the searching device-unique ID that was transmitted by the SPI master device 101 in units of eight bits in <Operation 3 of SPI master device 101>. As described in <Operation 3 of second SPI slave device 103>, the serial data 504 of a device-unique ID response is returned by one of the second SPI slave devices 103. This control is performed mainly by using the general-purpose one-bit register 308 (#1), the clock output control circuit 305 (#1), the reception shift register 303 and the reception register 307 illustrated in FIG. 3. When the above verification operation is repeated in units of eight bits so that the logical states of all the pieces of serial data 504 of the device-unique ID response corresponding to the serial data 502 of the searching device-unique ID become "L", the SPI master device 101 conducts the following operations. The SPI master device 101 recognizes that the search succeeded for the above searching device-unique ID as the device-unique ID corresponding to one of the second SPI slave devices 103, and registers that searching device-unique ID in an internal memory etc. When the logical state of one of the pieces of serial data 504 of the device-unique ID response corresponding to the serial data 502 of the searching device-unique ID becomes "Z", the SPI master device 101 conducts the following operations. This state occurs when all the second SPI slave devices 103 detect a non-match with the device-unique ID set for each device regarding the serial data 502 of the searching device-unique ID of the bit. In such a case, the SPI master device 101 recognizes that the search failed for the current searching device-unique ID, and does not perform the registration.

Operation 5 of SPI Master Device 101

After <Operation 4 of SPI master device 101>, the SPI master device 101 performs the following processes. As described in FIG. 2B, the SPI master device 101 controls the SS signal of FIG. 5 output through the SS terminal of FIG. 3 in the first logical state or at the low level for the length of one clock in synchronization with the CLK signal of FIG. 5 output through the CLK terminal of FIG. 3. Thereafter, the SPI master device 101 returns the SS signal to the second logical state or a high level. That moment is treated as the termination of the communication between the SPI master device 101 and the second SPI slave device 103. This control is performed mainly by using the general-purpose one-bit registers 308 (#0 and #2) in the microcomputer core 301 and the clock output control circuit 305 (#0) illustrated in FIG. 3. After the termination of a communication for one searching device-unique ID, the SPI master device 101 selects the next searching device-unique ID, and repeatedly conducts the operations 1-5 of the SPI master device 101 and the operations 1-3 of the second SPI slave device 103. This enables the SPI master device 101 to conduct a search for all searching device-unique IDs that may be set in the second SPI slave devices 103 connected to the SPI master device 101 and to register detected device-unique IDs.

Figure 6:
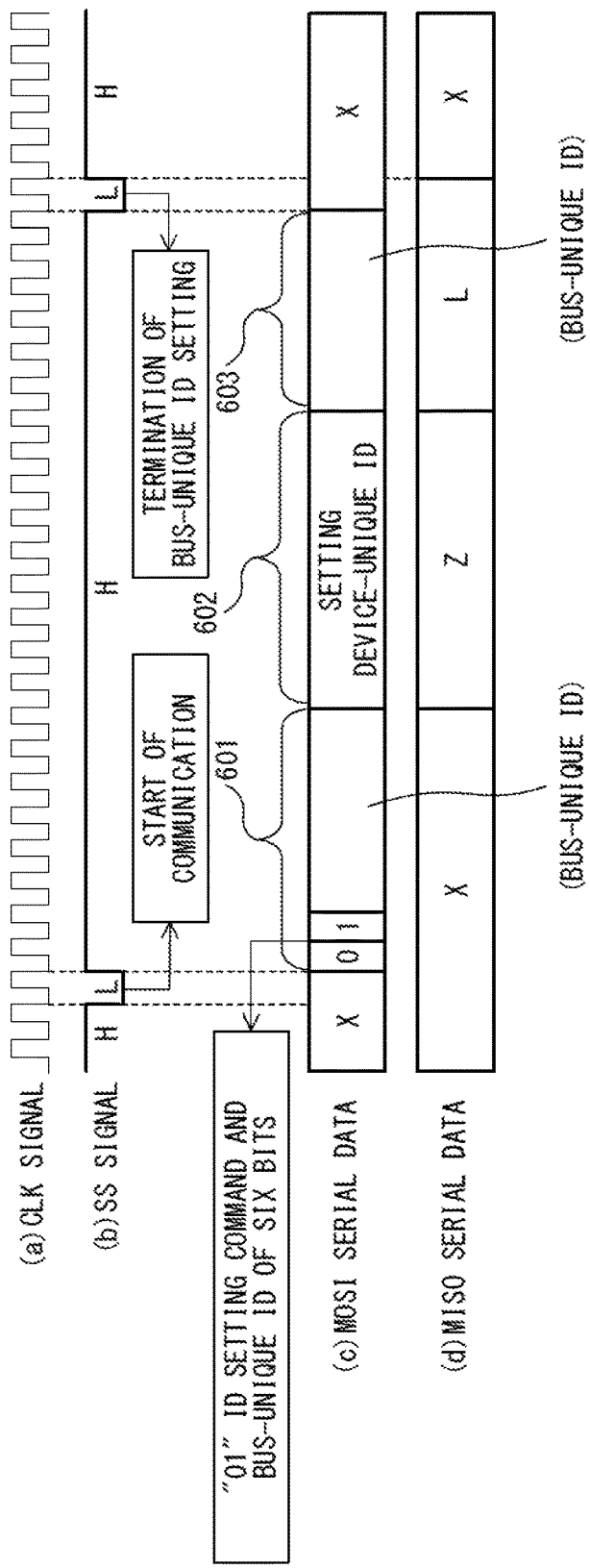
FIG. 6 is a timing chart illustrating an example of bus-unique ID setting process.

FIG. 6 is a timing chart illustrating an example of a bus-unique ID setting process. As described in <Basic operation 3>, since a device-unique ID for uniquely identifying the second SPI slave device 103 has a long data length, the SPI master device 101 assigns a bus-unique ID with a short data length to each second SPI slave device 103. Hereinafter, explanations will be given for a bus-unique ID setting process.

Operation 1 of SPI Master Device 101

As explained in FIG. 2B, the SPI master device 101 controls the SS signal of FIG. 6 output through the SS terminal of FIG. 3 in the first logical state or at a low level for the length of one clock that is in synchronization with the CLK signal of FIG. 6 output through the CLK terminal of FIG. 3. Thereafter, the SPI master device 101 returns the SS signal to the second logical state or a high level. That moment is treated as the start of the communication between the SPI master device 101 and the second SPI slave device 103. This control is performed mainly by using the general-purpose one-bit registers 308 (#0 and #2) in the microcomputer core 301 and the clock output control circuit 305 (#0) illustrated in FIG. 3.

Operation 2 of SPI Master Device 101

After the start of the communication, the SPI master device 101 conducts the following operations in the communication period of the second timing at which the SS signal was made to become a high level. The SPI master device 101 generates 8-bit serial data 601 in which "01" is set in the first two bits counting from the MSB as an ID setting command (identifier setting command) and the bus-unique ID that is to be set is embedded in the lower six bits. When a bus-unique ID has a data length longer than six bits, the higher six bits of the bus-unique ID are embedded in the above lower six bits. When a bus-unique ID has a data length shorter than six bits, zero is embedded in the higher bits so that it is treated as 6-bit data. The SPI master device 101 synchronizes this serial data 601 with the CLK signal of FIG. 6 output through the CLK terminal of FIG. 3, and outputs the data through the MOSI terminal of FIG. 3 as the MOSI serial data of FIG. 6. This control is performed mainly by using the transmission register 306, the transmission shift register 302, and the clock output control circuits 305 (#0 and #1) illustrated in FIG. 3.

Operation 3 of SPI Master Device 101

Subsequently to the transmission of the serial data 601, the SPI master device 101 conducts the following operations in the communication period after the start of the communication. The SPI master device 101 synchronizes serial data 602 corresponding to a setting device-unique ID with the CLK signal of FIG. 6 output through the CLK terminal of FIG. 3, and sequentially transmits the data through the MOSI terminal of FIG. 3 as the MOSI serial data of FIG. 6. This setting device-unique ID is selected from among device-unique IDs that are registered in the SPI master device 101 by the above device-unique ID searching process and device-unique ID response process. For the above operation, the SPI master device 101 uses the transmission register 306 and the transmission shift register 302 illustrated in FIG. 3 so as to transmit a setting device-unique ID having a data length of for example from 48 bits through 64 bits as the serial data 602 that has been segmented in units of eight bits counting from the MSB. This control is performed mainly by using the transmission register 306, the transmission shift register 302 and the clock output control circuits 305 (#0 and #1) illustrated in FIG. 3. Note that this transmission may be conducted sequentially from the LSB (Least Significant Bit) instead of the MSB.

Operation 4 of SPI Master Device 101

Subsequently to the transmission of the serial data 602, the SPI master device 101 conducts the following operations in the communication period after the start of the communication. As described above, when the bus-unique ID that is to be set has a data length longer than six bits, the higher six bits of the bus-unique ID are embedded in the lower six bits of the serial data 601. In such a case, the SPI master device 101 transmits the lower bits remaining in the bus-unique ID, sequentially from the higher bit side as serial data 603 that is segmented in units of eight bits. This control is performed mainly by using the transmission register 306, the transmission shift register 302 and the clock output control circuits 305 (#0 and #1) illustrated in FIG. 3.

Operation 1 of Second SPI Slave Device 103

In parallel to <Operation 1 of SPI master device 101>, the second SPI slave device 103 detects the SS signal of FIG. 6 input through the SS terminal of FIG. 4, the SS signal having been at a low level for the length of one clock of the CLK signal of FIG. 6 input through the CLK terminal of FIG. 4. Thereby, the second SPI slave device 103 enters a state in which it starts a communication. This control is performed mainly by using the one-clock decision circuit 404 and the general-purpose one-bit register 408 of #0 illustrated in FIG. 4.

Operation 2 of Second SPI Slave Device 103

In the communication period after the above start of the communication, the second SPI slave device 103 conducts the following operations in synchronization with the CLK signal of FIG. 6 input through the CLK terminal of FIG. 4. The second SPI slave device 103 receives "01" as the ID setting command in the first two bits counting from the MSB and the higher six bits of the lower-6-bit bus-unique ID as the first 8-bit serial data 601 that is input as the MOSI serial data of FIG. 6 through the MOSI terminal of FIG. 4. This control is performed mainly by using the general-purpose one-bit register 408 (#1), the clock output control circuit 405, the reception shift register 402 and the reception register 406. Thereafter the second SPI slave device 103 performs a bus-unique ID setting process.

Operation 3 of Second SPI Slave Device 103

In a bus-unique ID setting process, the second SPI slave device 103 conducts the following operations in synchronization with the CLK signal of FIG. 6 input through the CLK terminal of FIG. 4. The second SPI slave device 103 receives the serial data 602 of the setting device-unique ID that is sequentially input in units of eight bits as the MOSI serial data of FIG. 6 through the MOSI terminal of FIG. 4. This control is performed mainly by using the general-purpose one-bit register 408 (#1), the clock output control circuit 405, the reception shift register 402 and the reception register 406 illustrated in FIG. 4. The second SPI slave device 103 compares the above received setting device-unique ID with the device-unique ID set for the second SPI slave device 103 itself. When a correspondence is detected as a result of the comparison, the second SPI slave device 103 receives the serial data 603 of the remaining bits of the bus-unique ID that is sequentially input in units of eight bits as the MOSI serial data of FIG. 6 through the MOSI terminal of FIG. 4. This control is performed mainly by using the general-purpose one-bit register 408 (#1), the clock output control circuit 405, the reception shift register 402 and the reception register 406 illustrated in FIG. 4. The second SPI slave device 103 combines the higher six bits of the bus-unique ID that was received first and the remaining bits of the above received bus-unique ID so as to register the resultant data in an internal memory etc. as the bus-unique ID set for the second SPI slave device 103. The second SPI slave device 103 for which the bus-unique ID is set does not thereafter respond to the device-unique ID searching process described in FIG. 5.

Operation 5 of SPI Master Device 101

After <Operation 4 of SPI master device 101>, the SPI master device 101 performs the following processes. As described in FIG. 2B, the SPI master device 101 controls the SS signal of FIG. 6 output through the SS terminal of FIG. 3 in the first logical state or at the low level for the length of one clock in synchronization with the CLK signal of FIG. 6 output through the CLK terminal of FIG. 3. Thereafter, the SPI master device 101 returns the SS signal to the second logical state or a high level. That moment is treated as the termination of the communication between the SPI master device 101 and the second SPI slave device 103. This control is performed mainly by using the general-purpose one-bit registers 308 (#0 and #2) in the microcomputer core 301 and the clock output control circuit 305 (#0) illustrated in FIG. 3. After the end of a communication for one setting device-unique ID, the SPI master device 101 selects the next setting device-unique ID that has not been transmitted. As described above, this setting device-unique ID is selected from among device-unique IDs that are registered in the SPI master device 101 by the above device-unique ID searching process and device-unique ID response process. Further, the SPI master device 101 determines a new bus-unique ID in such a manner that the new bus-unique ID corresponds to the setting device-unique ID that has been selected newly. The new bus-unique ID can identify a target device among the plurality of second SPI slave devices 103 that are connected to the SPI master device 101. Then, the operations 1-5 above of the SPI master device 101 and operations 1-3 above of the second SPI slave device 103 are conducted for the setting device-unique ID and new bus-unique ID. This enables the SPI master device 101 to register a bus-unique ID that can uniquely identify a second SPI slave device 103 for each second SPI slave device 103 connected to the SPI master device 101. Thereafter, the SPI master device 101 and the second SPI slave devices 103 conduct SPI communications by using bus-unique IDs.

Figure 7:
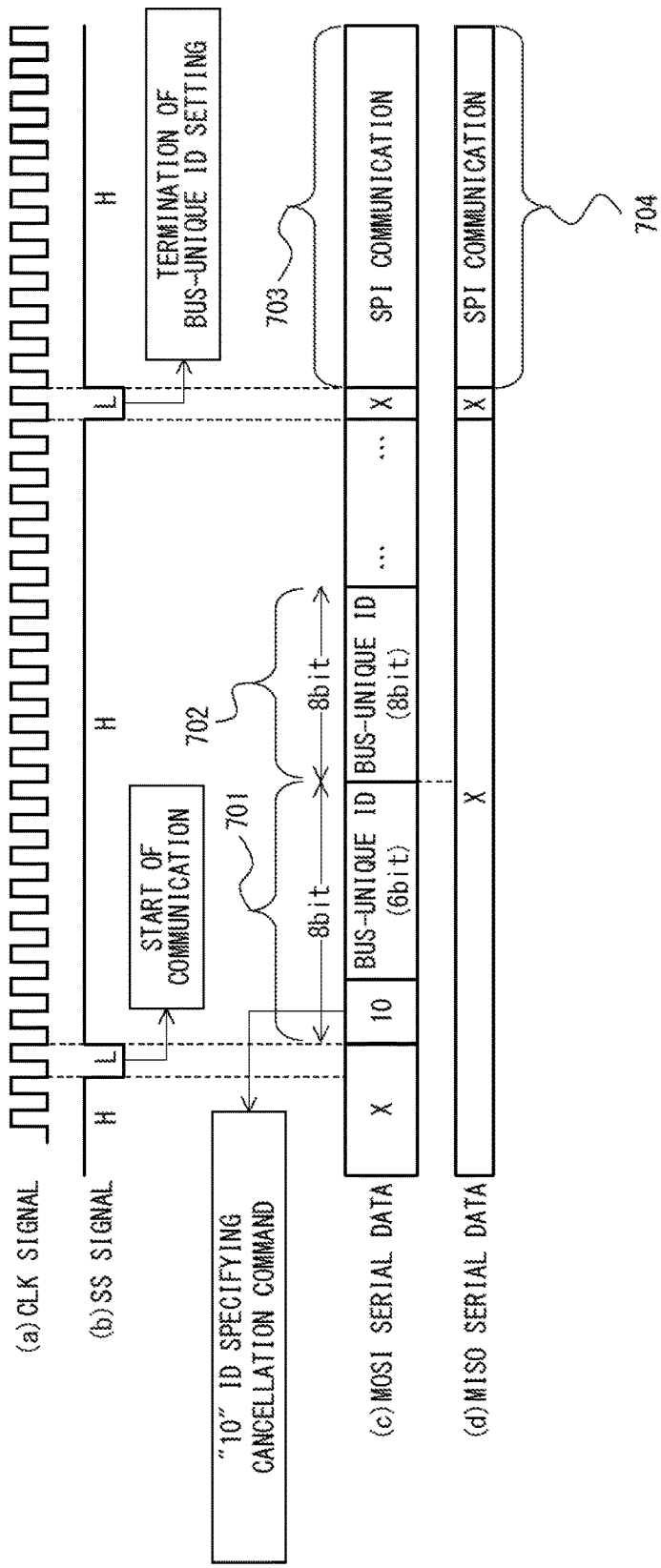
FIG. 7 is a timing chart illustrating an example of an SPI communication process that uses a bus-unique ID.

FIG. 7 is a timing chart illustrating an example of an SPI communication process that uses a bus-unique ID. By using a bus-unique ID, the SPI master device 101 specifies the second SPI slave device 103 to conduct a communication with or cancels the specifying. The second SPI slave device 103 having its bus-unique ID specified can conduct a communication through an SPI communication with an SS signal remaining in a high level state. The second SPI slave device 103 not having its bus-unique ID specified does not make any responses to an SPI communication unless the specifying of the bus-unique ID is canceled. Also, the first SPI slave device 102 based on a general scheme does not make responses to an SPI communication either when an SS signal is in a high level state. Hereinafter, explanations will be given for an SPI communication process that uses a bus-unique ID.

Operation 1 of SPI Master Device 101

As explained in FIG. 2B, the SPI master device 101 controls the SS signal of FIG. 7 output through the SS terminal of FIG. 3 in the first logical state or at a low level for the length of one clock that is in synchronization with the CLK signal of FIG. 7 output through the CLK terminal of FIG. 3. Thereafter, the SPI master device 101 returns the SS signal to the second logical state or a high level. That moment is treated as the start of the communication between the SPI master device 101 and the second SPI slave device 103. This control is performed mainly by using general-purpose one-bit registers 308 (#0 and #2) in the microcomputer core 301 and the clock output control circuit 305 (#0) illustrated in FIG. 3.

Operation 2 of SPI Master Device 101

After the start of the communication, the SPI master device 101 conducts the following operations in the communication period of the second timing at which the SS signal was made to become a high level. The SPI master device 101 generates 8-bit serial data 701 in which "10" is set in the first two bits counting from the MSB as an ID-specifying command (identifier specifying command) and a bus-unique ID that is to be set is embedded in the lower six bits. When a bus-unique ID has a data length longer than six bits, the higher six bits of the bus-unique ID are embedded in the above lower six bits. When a bus-unique ID has a data length shorter than six bits, zero is embedded in the higher bits so that it is treated as 6-bit data. The SPI master device 101 synchronizes this serial data 701 with the CLK signal of FIG. 7 output through the CLK terminal of FIG. 3, and outputs the data through the MOSI terminal of FIG. 3 as the MOSI serial data of FIG. 7. This control is performed mainly by using the transmission register 306, the transmission shift register 302 and the clock output control circuits 305 (#0 and #1) illustrated in FIG. 3.

Operation 3 of SPI Master Device 101

Subsequently to the transmission of the serial data 701, the SPI master device 101 conducts the following operations in the communication period after the start of the communication. As described above, when the bus-unique ID that is desired to be set has a data length longer than six bits, the higher six bits of the bus-unique ID are embedded in the lower six bits of the serial data 701. In such a case, the SPI master device 101 transmits the lower bits remaining in the bus-unique ID, sequentially from the higher bit side as serial data 702 that is segmented in units of eight bits. This control is performed mainly by using the transmission register 306, the transmission shift register 302 and the clock output control circuits 305 (#0 and #1) illustrated in FIG. 3.

Operation 1 of Second SPI Slave Device 103

In parallel to <Operation 1 of SPI master device 101>, the second SPI slave device 103 detects the SS signal of FIG. 7 input through the SS terminal of FIG. 4, the SS signal having been at a low level for the length of one clock of the CLK signal of FIG. 7 input through the CLK terminal of FIG. 4. Thereby, the second SPI slave device 103 enters a state in which it starts a communication. This control is performed mainly by using the one-clock decision circuit 404 and the general-purpose one-bit register 408 (#0) illustrated in FIG. 4.

Operation 2 of Second SPI Slave Device 103

In the communication period after the above start of the communication, the second SPI slave device 103 conducts the following operations in synchronization with the CLK signal of FIG. 7 input through the CLK terminal of FIG. 4. The second SPI slave device 103 receives "10" as the ID-specifying command in the first two bits counting from the MSB and the higher six bits of the lower-6-bit bus-unique ID as the first 8-bit serial data 701 that is input as the MOSI serial data of FIG. 7 through the MOSI terminal of FIG. 4. This control is performed mainly by using the general-purpose one-bit register 408 (#1), the clock output control circuit 405, the reception shift register 402, and the reception register 406 illustrated in FIG. 4. Thereafter the second SPI slave device 103 performs an SPI communication process that uses a bus-unique ID.

Operation 3 of Second SPI Slave Device 103

In a bus-unique ID setting process, the second SPI slave device 103 conducts the following operations in synchronization with the CLK signal of FIG. 7 input through the CLK terminal of FIG. 4. The second SPI slave device 103 receives the serial data 702 of the remaining bits of the bus-unique ID that is sequentially input in units of eight bits as the MOSI serial data of FIG. 7 through the MOSI terminal of FIG. 4. This control is performed mainly by using the general-purpose one-bit register 408 (#1), the clock output control circuit 405, the reception shift register 402 and the reception register 406 illustrated in FIG. 4. The second SPI slave device 103 compares a bus-unique ID resulting from combining the higher six bits of the bus-unique ID received earlier and the remaining bits of the above bus-unique ID with the bus-unique ID that is registered for the second SPI slave device 103 itself in the above bus-unique ID setting process of FIG. 6. When a correspondence is detected as a result of the comparison, the second SPI slave device 103 enters a standby state for an SPI communication.

Operation 4 of SPI Master Device 101

After <Operation 3 of SPI master device 101>, the SPI master device 101 performs the following processes. As described in FIG. 2B, the SPI master device 101 controls the SS signal of FIG. 7 output through the SS terminal of FIG. 3 in the first logical state or at the low level for the length of one clock in synchronization with the CLK signal of FIG. 7 output through the CLK terminal of FIG. 3. Thereafter, the SPI master device 101 returns the SS signal to the second logical state or a high level. This control is performed mainly by using the general-purpose one-bit registers 308 (#0 and #2) and the clock output control circuit 305 (#0) illustrated in FIG. 3. Thereafter, the SPI master device 101 transmits serial data 703 of an SPI communication through the MOSI terminal of FIG. 3 in synchronization with the CLK signal of FIG. 7 output through the CLK terminal of FIG. 3.

Operation 4 of Second SPI Slave Device 103

The second SPI slave device 103 having entered a standby state for an SPI communication in response to <Operation 3 of second SPI slave device 103> conducts the following processes. In parallel to <Operation 4 of SPI master device 101>, the second SPI slave device 103 detects the SS signal of FIG. 7 input through the SS terminal of FIG. 4, the SS signal having been at a low level for the length of one clock of the CLK signal of FIG. 7 input through the CLK terminal of FIG. 4. Thereby, the second SPI slave device 103 enters a state in which it can conduct an SPI communication. This control is performed mainly by using the one-clock decision circuit 404 and the general-purpose one-bit register 408 (#0) illustrated in FIG. 4. In the state in which an SPI communication is available, the second SPI slave device 103 receives and processes the serial data 703 of FIG. 7 of an SPI communication that is input through the MOSI terminal of FIG. 4 in synchronization with the CLK signal of FIG. 7 input through the CLK terminal of FIG. 4. This control is performed mainly by using the general-purpose one-bit register 408 (#1), the clock output control circuit 405, the reception shift register 402 and the reception register 406 illustrated in FIG. 4. In the state in which an SPI communication is available, the second SPI slave device 103 transmits serial data 704 of the SPI communication of FIG. 7 as necessary through the MISO terminal of FIG. 4 in synchronization with the CLK signal of FIG. 7 input through the CLK terminal of FIG. 4. This control is performed mainly by using the transmission register 407, the transmission shift register 403 and the clock output control circuit 405 illustrated in FIG. 4. The second SPI slave device 103 that did not enter a standby state for an SPI communication because a correspondence of bus-unique IDs was not detected in the comparison process in <Operation 3 of second SPI slave device 103> does not make responses to serial data of an SPI communication transmitted from the SPI master device 101 until the second SPI slave device 103 thereafter receives a command for cancelling the specifying of the bus-unique ID or a resetting command.

Operation 5 of SPI Master Device 101

When the SPI communication based on <Operation 4 of SPI master device 101> is to be terminated, the SPI master device 101 controls the SS signal of FIG. 7 output through the SS terminal of FIG. 3 in the first logical state or at a low level for the length of one clock that is in synchronization with the CLK signal of FIG. 7 output through the CLK terminal of FIG. 3. This control is performed mainly by using the general-purpose one-bit registers 308 (#0 and #2) and the clock output control circuit 305 (#0) illustrated in FIG. 3. After the start of the communication, the SPI master device 101 conducts the following operations in the communication period of the second timing at which the SS signal was made to become a high level. The SPI master device 101 generates 8-bit serial data in which "10" is set in the first two bits counting from the MSB as an ID-specifying command (identifier specifying command) and "000000" is embedded in the lower six bits. This data functions as an ID-specifying cancellation command. The SPI master device 101 synchronizes this serial data with the CLK signal of FIG. 7 output through the CLK terminal of FIG. 3, and transmits the data through the MOSI terminal of FIG. 3 as the MOSI serial data of FIG. 7. This control is performed mainly by using the transmission register 306, the transmission shift register 302 and the clock output control circuits 305 (#0 and #1) illustrated in FIG. 3. Then, the SPI master device 101 controls the SS signal of FIG. 7 output through the SS terminal of FIG. 3 in the first logical state or at a low level for the length of one clock that is in synchronization with the CLK signal of FIG. 7 output through the CLK terminal of FIG. 3. This control is performed mainly by using the general-purpose one-bit registers 308 (#0 and #2) and the clock output control circuit 305 (#0) illustrated in FIG. 3.

Operation 5 of Second SPI Slave Device 103

In parallel to <Operation 5 of SPI master device 101>, the second SPI slave device 103 detects the SS signal of FIG. 7 input through the SS terminal of FIG. 4, the SS signal having been at a low level for the length of one clock of the CLK signal of FIG. 7 input through the CLK terminal of FIG. 4. This control is performed mainly by using the one-clock decision circuit 404 and the general-purpose one-bit register 408 (#0) illustrated in FIG. 4. Sequentially, the second SPI slave device 103 conducts the following operations in synchronization with the CLK signal of FIG. 7 input through the CLK terminal of FIG. 4. The second SPI slave device 103 receives "10" as the ID-specifying command in the two bits counting from the MSB and "000000" in the lower six bits, as the serial data of the first eight bits that is input as the MOSI serial data of FIG. 7 through the MOSI terminal of FIG. 4. This control is performed mainly by using the general-purpose one-bit register 408 (#1), the clock output control circuit 405, the reception shift register 402 and the reception register 406 illustrated in FIG. 4. When receiving a combination of "10" as an ID-specifying command and "000000" as the lower six bits, the second SPI slave device 103 terminates the SPI communication that it has conducted until that moment.

Figure 8:
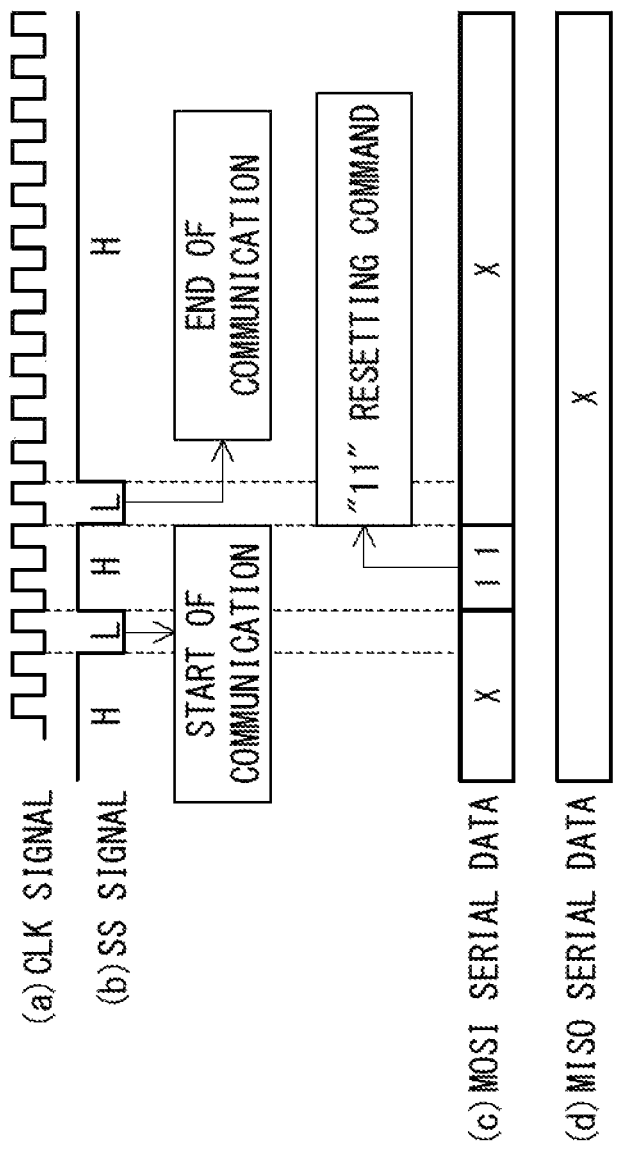
FIG. 8 is a timing chart illustrating an example of a resetting process.

FIG. 8 is a timing chart illustrating an example of a resetting process. This resetting process is performed in a case when it is desired that the SPI master device 101 enter the initial state without turning off of the power source (such as a case of warm reset etc.) among other cases. Explanations will be given for the flow of the resetting process below.

Operation 1 of SPI Master Device 101

As described in FIG. 2B, the SPI master device 101 controls the SS signal of FIG. 8 output through the SS terminal of FIG. 3 in the first logical state or at the low level for the length of one clock in synchronization with the CLK signal of FIG. 8 output through the CLK terminal of FIG. 3. Thereafter, the SPI master device 101 returns the SS signal to the second logical state or a high level. That moment is treated as the start of the communication between the SPI master device 101 and the second SPI slave device 103. This control is performed mainly by using the general-purpose one-bit registers 308 (#0 and #2) and the clock output control circuit 305 (#0) illustrated in FIG. 3.

Operation 2 of SPI Master Device 101

After the start of the communication, the SPI master device 101 conducts the following operations in the communication period of the second timing at which the SS signal was made to become a high level. The SPI master device 101 generates serial data in which "11" is set in the first two bits counting from the MSB as a resetting command. The SPI master device 101 synchronizes this serial data with the CLK signal of FIG. 8 output through the CLK terminal of FIG. 3, and outputs the data through the MOSI terminal of FIG. 3 as the MOSI serial data of FIG. 8. This control is performedmainly by using the transmission register 306, the transmission shift register 302 and the clock output control circuits 305 (#0 and #1) illustrated in FIG. 3.

Operation 1 of Second SPI Slave Device 103

In parallel to <Operation 1 of SPI master device 101>, the second SPI slave device 103 detects the SS signal of FIG. 8 input through the SS terminal of FIG. 4, the SS signal having been at a low level for the length of one clock of the CLK signal of FIG. 8 input through the CLK terminal of FIG. 4. Thereby, the second SPI slave device 103 enters a state in which it starts a communication. This control is performed mainly by using the one-clock decision circuit 404 and the general-purpose one-bit register 408 (#0) illustrated in FIG. 4.

Operation 2 of Second SPI Slave Device 103

In the communication period after the above start of the communication, the second SPI slave device 103 conducts the following operations in synchronization with the CLK signal of FIG. 8 input through the CLK terminal of FIG. 4. The second SPI slave device 103 receives "11" of a resetting command in the two bits counting from the MSB as the MOSI serial data of FIG. 8 input through the MOSI terminal of FIG. 4. This control is performed mainly by using the general-purpose one-bit register 408 (#1), the clock output control circuit 405, the reception shift register 402 and the reception register 406 illustrated in FIG. 4. As a result of this, the second SPI slave device 103 cancels the registration of the bus-unique ID set for the second SPI slave device 103 in the bus-unique ID setting process of FIG. 6.

Operation 3 of SPI Master Device 101

After <Operation 2 of second SPI slave device 103>, the SPI master device 101 cancels the registration of the device-unique ID that was searched for in the device-unique ID searching process illustrated in FIG. 5 and the registration of the bus-unique ID set in the bus-unique ID setting process illustrated in FIG. 6.

Figure 9:
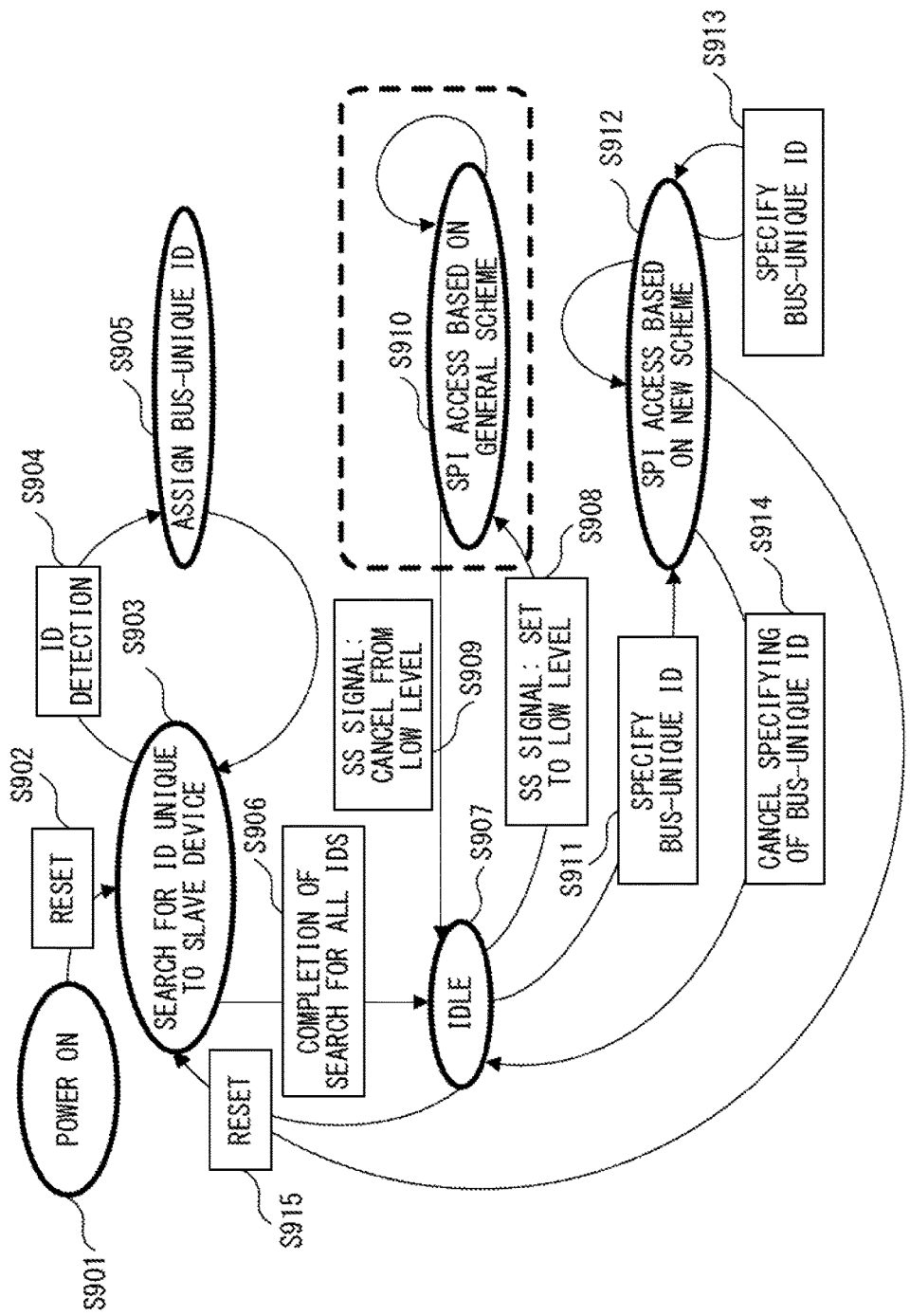
FIG. 9 illustrates an example of a state transition of the SPI master device.

FIG. 9 illustrates state transitions of a control process by the SPI master device 101 explained by referring to FIG. 5 through FIG. 8.

The SPI master device 101 transits to the state of the device-unique ID searching process described in FIG. 5 (S903) via the state of the reset state (S902) after the power activation (S901).

Sequentially, when a device-unique ID is detected (S904) in the state of a device-unique ID searching process (S903), the SPI master device 101 transits to the state of the bus-unique ID described in FIG. 6 (S905), and returns to the state of the device-unique ID searching process (S903).

Upon the completion of the search for all device-unique IDs and the registration of bus-unique IDs in the device-unique ID searching process (S903 and S906), the SPI master device 101 transits to an idle state (S907).

The SPI master device 101 transits from an idle state (S907) to an SPI access (S910) for the first SPI slave device 102 based on a general scheme in response to the setting of the SS signal to a low level (S908), and returns to the idle state (S907) in response to the cancellation of the SS signal from the low level (S909).

Further, the SPI master device 101 transits from an idle state (S907) to a state of an SPI access for the second SPI slave device 103 (S912) that operates based on the extended scheme, by the SPI communication process (S911) that uses a bus-unique ID illustrated in FIG. 7.

When a different bus-unique ID is specified (S913) in the state of an SPI access (S912), the SPI master device 101 transits to a state of an SPI access (S912) for the second SPI slave device 103 that corresponds to that bus-unique ID.

When cancellation of specifying of the bus-unique ID described in FIG. 7 (S914) is performed in the state of an SPI access (S912), the SPI master device 101 returns to an idle state (S907).

In an idle state (S907), the SPI master device 101 transits to a state of the device-unique ID searching process described in FIG. 5, by the resetting process (S915) described in FIG. 8 (S903).

Figure 10:
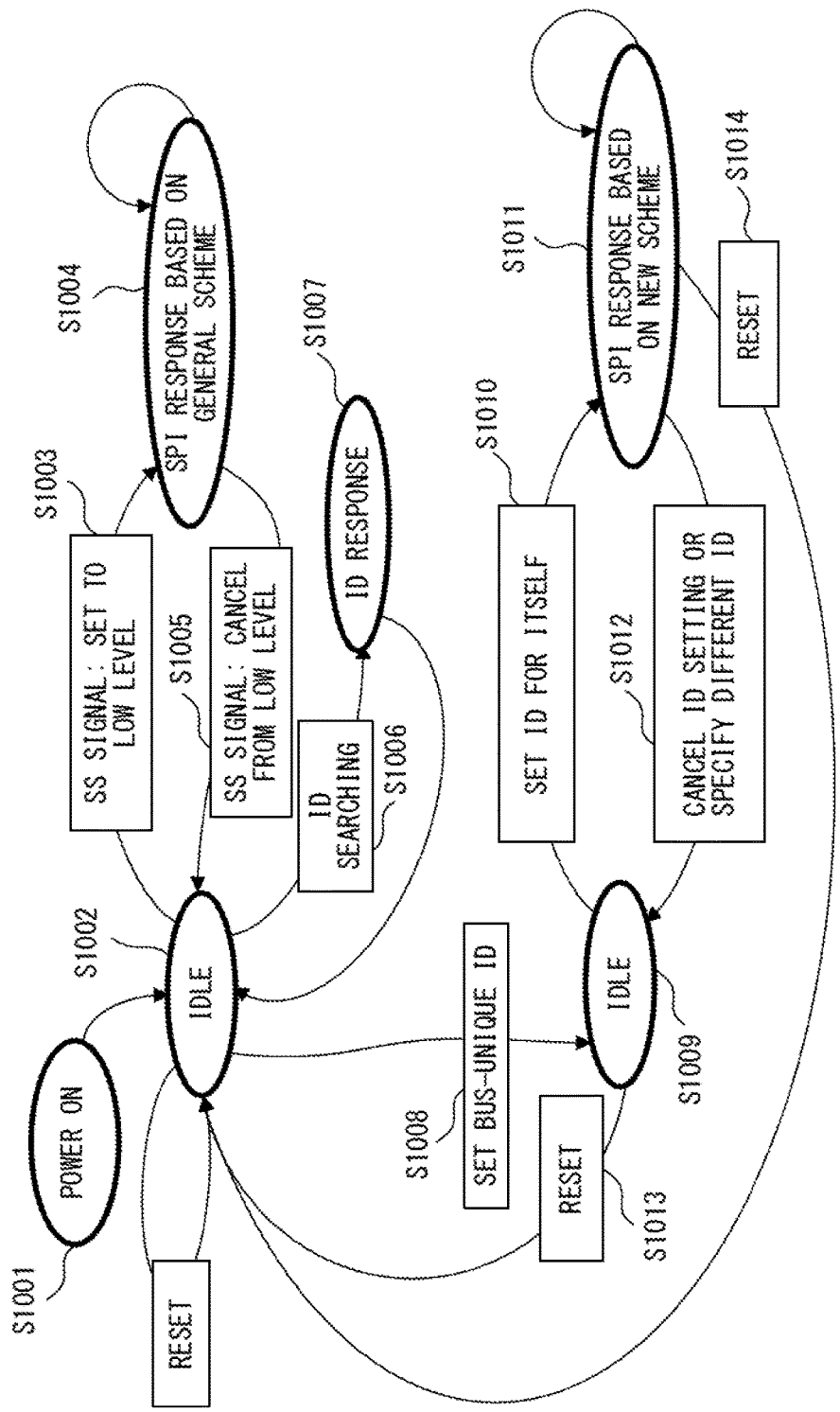
FIG. 10 illustrates an example of a state transition of a second SPI slave device.

FIG. 10 illustrates a state transition of a control process by the second SPI slave device 103 and the first SPI slave device 102 explained in FIG. 5 through FIG. 8.

First, the first SPI slave device 102 or the second SPI slave device 103 transits to a first idle state (S1002) after power activation (S1001).

The first SPI slave device 102 transits from the first idle state (S1002) to an SPI response (S1004) for the SPI master device 101 based on the general scheme in response to the setting of the SS signal to a low level (S1003), and returns to the first idle state (S1002) in response to the cancellation of the SS signal from the low level (S1005).

In response to the device-unique ID searching process (S1006) by the SPI master device 101 described in FIG. 5, the second SPI slave device 103 transits from the first idle state (S1002) to a state of a device-unique ID response process (S1007). Thereafter, the second SPI slave device 103 returns to the first idle state (S1002).

The second SPI slave device 103 sets a bus-unique ID for the second SPI slave device 103 itself by the bus-unique ID setting process (S1008) described in FIG. 6 so as to transit to a second idle state (S1009) from the first idle state (S1002).

When the bus-unique ID registered for the second SPI slave device 103 itself is specified (S1010) in the SPI communication process that uses a bus-unique ID by the SPI master device 101 of FIG. 7 in the second idle state (S1009), the second SPI slave device 103 performs the following processes. In this case, the second SPI slave device 103 transits to an SPI response (S1011) for the SPI master device 101 that operates on the extended scheme.

When the specifying of the bus-unique ID is cancelled or the identifying of a different bus-unique ID is conducted as described in FIG. 7 (S1012) in the state of an SPI response (S1011), the second SPI slave device 103 returns to the second idle state (S1009).

By the resetting process (S1013 or S1014) described in FIG. 8 in the second idle state (S1009) or the state of an SPI response (S1011), the second SPI slave device 103 returns to the first idle state (S1002).

Figure 11:
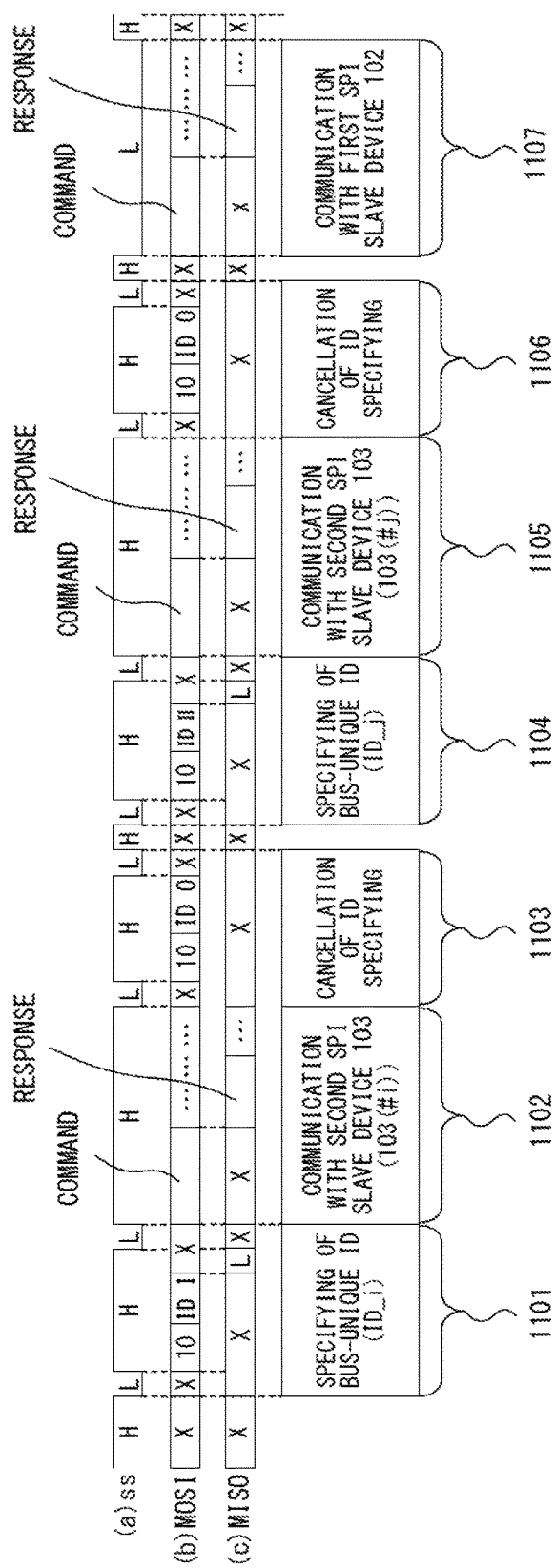
FIG. 11 is a timing chart illustrating an operation example of the transmission system according to the present embodiment.

FIG. 11 is a timing chart illustrating an operation example of the transmission system according to the present embodiment. As described in FIG. 7, bus-unique ID_i is specified in a communication period 1101. As a result of this, in a period 1102 in which the SS signal is a high level subsequent to the communication period, it becomes possible for the SPI master device 101 to conduct an SPI communication based on the extended scheme with the i-th second SPI slave device 103. In the period 1102, other second SPI slave devices 103 not having their bus-unique IDs specified do not make responses to communications from the SPI master device 101. Also, in the period 1102, because the SS signal is at a high level, the first SPI slave device 102 based on a general scheme does not make responses to communications from the SPI master device 101 either. Upon termination of this SPI communication, the specifying of the bus-unique ID is cancelled in the communication period 1103.

Next, as described in FIG. 7, bus-unique ID j is specified in a communication period 1104. As a result of this, in a period 1105 in which the SS signal is a high level subsequent to the communication period, it becomes possible for the SPI master device 101 to conduct an SPI communication based on the extended scheme with the j-th second SPI slave device 103. In the period 1105, other second SPI slave devices 103 not having their bus-unique IDs specified do not make responses to communications from the SPI master device 101. Also, in the period 1105, because the SS signal is at a high level, the first SPI slave device 102 based on a general scheme does not make responses to communications from the SPI master device 101 either. Upon termination of this SPI communication, the specifying of the bus-unique ID is cancelled in the communication period 1106.

When the SPI master device 101 try to conduct a communication with the first SPI slave device 102 based on a general scheme, the SPI master device 101 sets the SS signal to a low level in the period 1107. Thereby, it becomes possible for the SPI master device 101 to conduct an SPI communication based on a general scheme with the first SPI slave device 102.

By referring to the flowcharts of FIG. 12 through FIG. 19 and FIG. 20 through FIG. 22, explanations will be given for a process performed when the microcomputer core 301 of the SPI master device 101 illustrated in FIG. 3 or the microcomputer core 401 of the second SPI slave device 103 illustrated in FIG. 4 performs the processes of those flowcharts by using driver software programs that are installed in the microcomputer core 301 and the microcomputer core 401.

Figure 12:
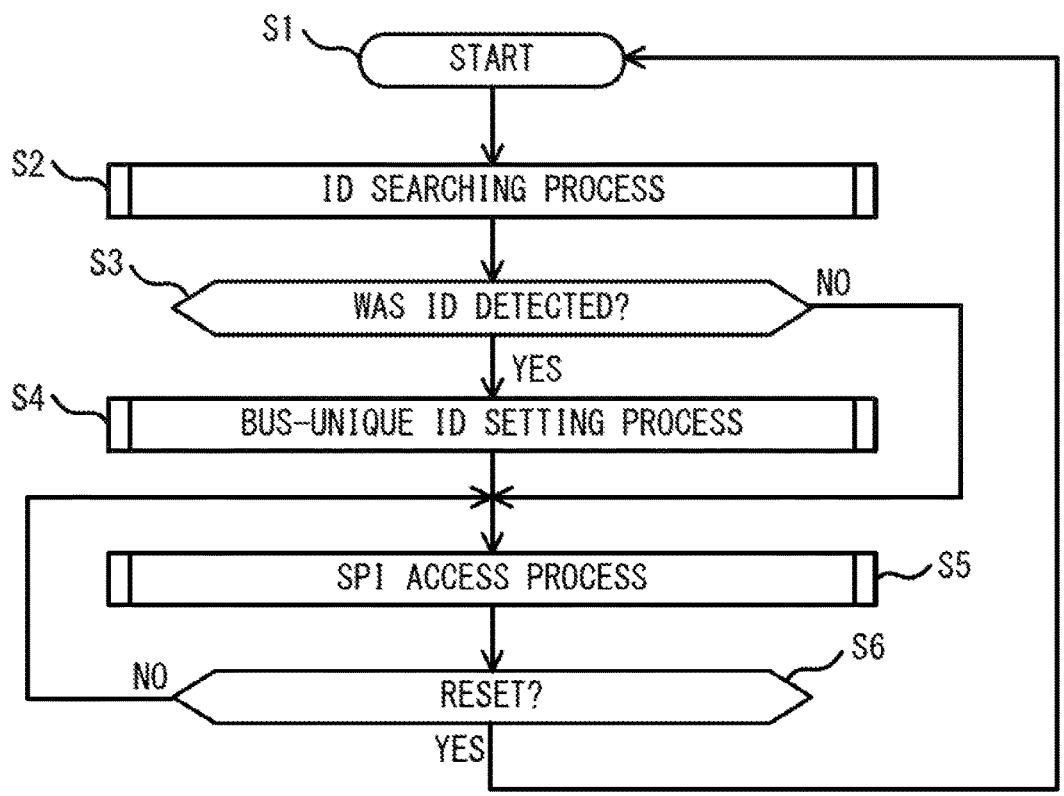
FIG. 12 is a flowchart explaining an example of an overall control process that is performed by the SPI master device.

FIG. 12 is a flowchart explaining an example of an overall control process that is performed by the SPI master device 101. The microcomputer core 301 illustrated in FIG. 3 starts a control process for an SPI interface (S1). Also, when resetting is performed at an arbitrary timing by the resetting process described in FIG. 8, the process returns to this S1.

Next, the microcomputer core 301 performs the device-unique ID searching process that is described in FIG. 5 (S2). The microcomputer core 301 determines whether or not a device-unique ID was detected as a result of performing S2 (S3).

When the determination is Yes in S3, the microcomputer core 301 performs the bus-unique ID setting process described in FIG. 6 (S4). When the determination is No in S3, this process is skipped. Thereafter, the microcomputer core 301 makes an SPI access (S5).

The microcomputer core 301 determines whether or not resetting was performed by the resetting process described in FIG. 8 (S6). When the determination is No in S6, the microcomputer core 301 returns to the process of the SPI access in S5. When the determination is Yes in S6, the microcomputer core 301 returns to S1.

Figure 13:
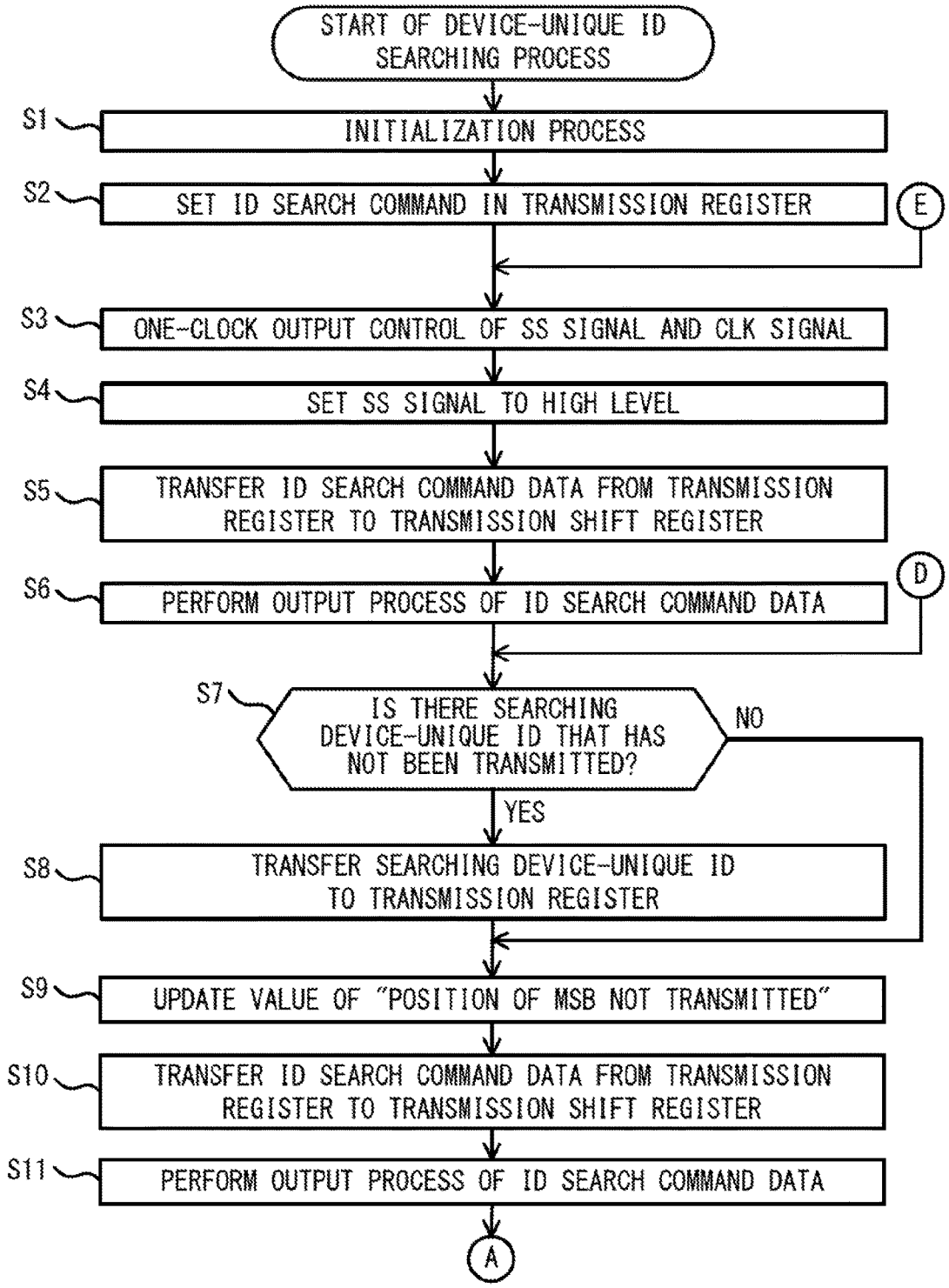
FIG. 13 through FIG. 15 are flowcharts explaining detailed examples of a device-unique ID searching process.
Figure 14:
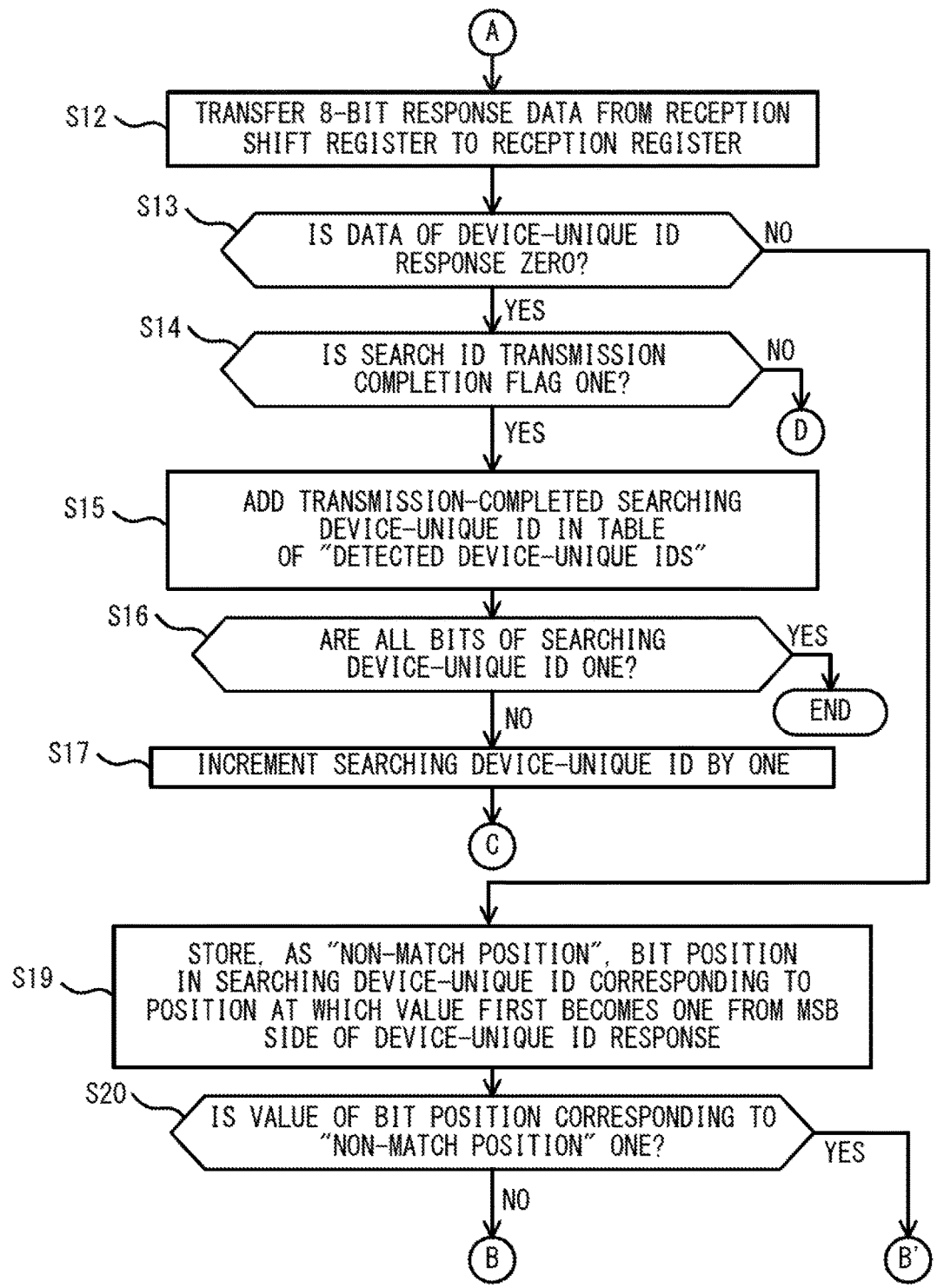
Figure 15:
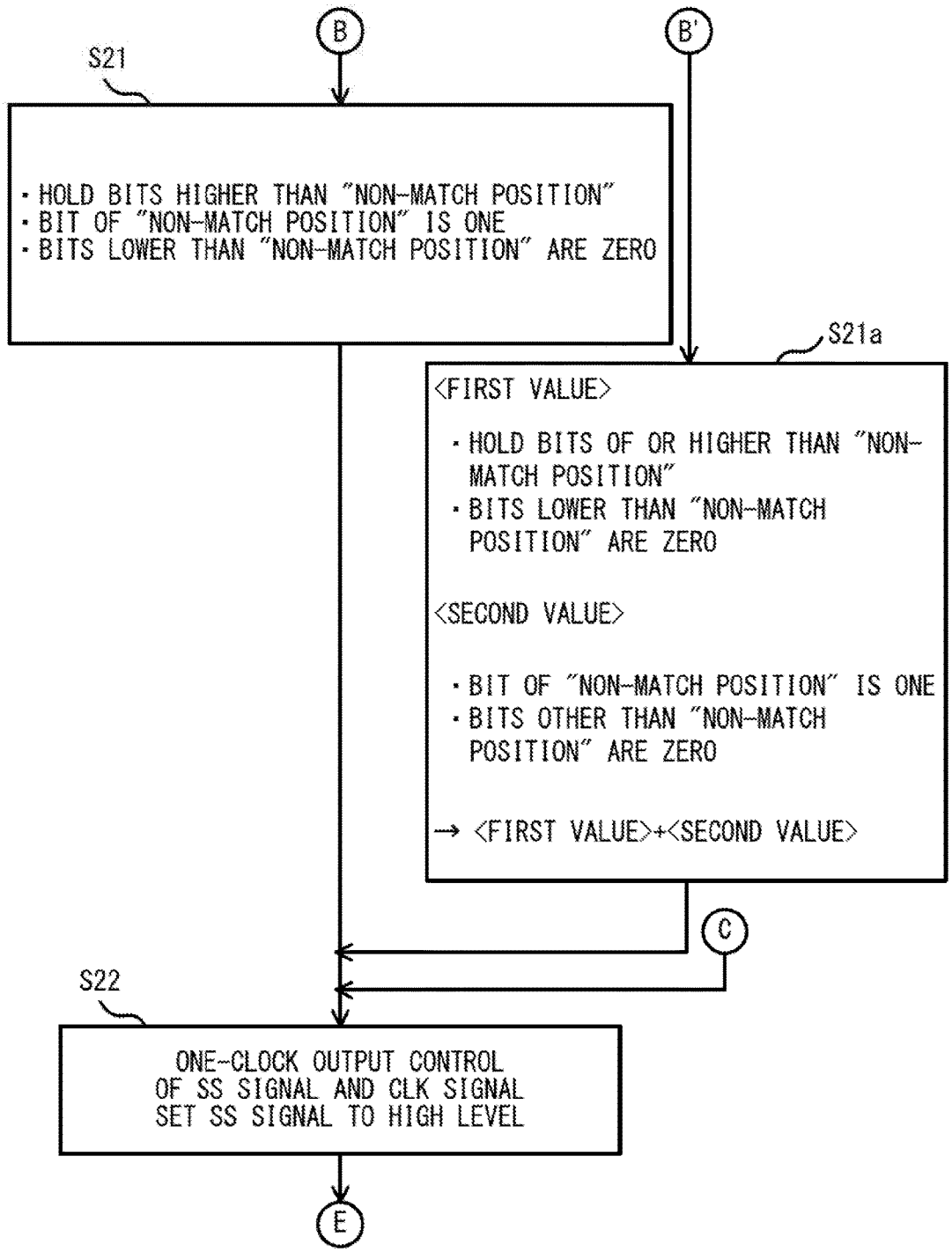

FIG. 13 through FIG. 15 are flowcharts explaining detailed examples of the device-unique ID searching process of S2 illustrated in FIG. 12. This process corresponds to the device-unique ID searching process of FIG. 5 conducted by the SPI master device 101.

The microcomputer core 301 first performs an initialization process (S1 in FIG. 13). In this process, the microcomputer core 301 sets a searching device-unique ID that is temporarily stored in a memory (not illustrated) to "0" ("0000 0000 0000 0000 . . . 0000 0000" in binary"). Also, the microcomputer core 301 clears a "search ID transmission completion flag", which will be described later, stored in a memory (not illustrated). Also, the microcomputer core 301 changes the value of a variable to "63" as the MSB (Most Significant Bit), the variable being for storing the "position of the most significant bit that has not been transmitted", which will be described later, stored in a memory (not illustrated). Further, the microcomputer core 301 makes the MISO terminal of FIG. 3 function as an open drain output.

Next, in the transmission register 306 of FIG. 3, the microcomputer core 301 sets "00" in the higher two bits and "000000" in the lower six bits, "00" being the value of the ID search command described in FIG. 5 (S2 in FIG. 13). This process corresponds to <Operation 2 of SPI master device 101> described in FIG. 5.

Next, the microcomputer core 301 performs control of an SS signal and a CLK signal (S3 in FIG. 13). This process corresponds to <Operation 1 of SPI master device 101> described in FIG. 5. That is, the microcomputer core 301 generates a signal that keeps an SS signal output through the SS terminal of FIG. 3 at a low level for the length of one clock of a CLK signal output through the CLK terminal of FIG. 3. Specifically, the microcomputer core 301 sets a low-level value in the general-purpose one-bit register 308 (#2) illustrated in FIG. 3. Then, the microcomputer core 301 controls the general-purpose one-bit register 308 (#0) of FIG. 3 so as to make it output a CLK signal for one cycle via the clock output control circuit 305 (#0).

After the control of the SS signal in S3, the microcomputer core 301 performs control by which the SS signal is made to become a high level (S4 in FIG. 13). This process corresponds to <Operation 1 of SPI master device 101> described in FIG. 5. Specifically, the microcomputer core 301 sets a high-level value in the general-purpose one-bit register 308 (#2) illustrated in FIG. 3.

The microcomputer core 301 transfers, to the transmission shift register 302, 8-bit data containing the ID search command that was set in the transmission register 306 of FIG. 3 in S2 (S5 in FIG. 13). This process corresponds to <Operation 2 of SPI master device 101> described in FIG. 5.

The microcomputer core 301 performs an output process of the 8-bit data containing the ID search command (S6 in FIG. 13). This process corresponds to <Operation 2 of SPI master device 101> described in FIG. 5. Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1). As a result of this, the 8-bit data containing the ID search command transferred to the transmission shift register 302 in S5 is sequentially output as the serial data (which corresponds to the data 501 of FIG. 5) through the MOSI terminal. At the same time, the serial data of eight bits that is sequentially input through the MISO terminal is sequentially stored in the reception shift register 303.

S7 through S11 in FIG. 13 correspond to <Operation 3 of SPI master device 101> described in FIG. 5.

First, the microcomputer core 301 determines whether or not the bits of the searching device-unique ID temporarily stored in a memory (not illustrated) involve a portion that has not been transmitted to the transmission register 306 of FIG. 3 (S7 in FIG. 13).

When the bits of the searching device-unique ID in the memory involve a portion that has not been transmitted to the transmission register 306 of FIG. 3 (Yes in S7), the microcomputer core 301 performs the transfer process of the searching device-unique ID (S8 in FIG. 13). In this process, the microcomputer core 301 transfers, to the transmission register 306 of FIG. 3, the eight bits counting from the position indicated by the variable of "position of the most significant bit that has not been transmitted" in a memory that are among the bits of the searching device-unique ID in the memory.

The microcomputer core 301 rewrites the value of the variable "position of the most significant bit that has not been transmitted" in a memory to the position, updated in S8, of the most significant bit that has not been transmitted among the bits of the searching device-unique ID (S9 in FIG. 13).

The microcomputer core 301 transfers, to the transmission shift register 302, the 8-bit data of the searching device-unique ID set in the transmission register 306 of FIG. 3 in S8 (S10 in FIG. 13).

The microcomputer core 301 performs an output process of the 8-bit data of the searching device-unique ID (S11 in FIG. 13). Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1).

As a result of this, the 8-bit data containing the searching device-unique ID transferred to the transmission shift register 302 in S10 is sequentially output as the serial data (which corresponds to the data 502 of FIG. 5) through the MOSI terminal. At the same time, the serial data of eight bits that is sequentially input through the MISO terminal is sequentially stored in the reception shift register 303.

S12-S16 in FIG. 14 correspond to <Operation 4 of SPI master device 101> described in FIG. 5.

First, the microcomputer core 301 transfers, to the reception register 307 of FIG. 3, the 8-bit data stored in the reception shift register 303 in S11 of FIG. 13 (S12 in FIG. 14). This data is a device-unique ID response from one of the second SPI slave devices 103.

The microcomputer core 301 determines whether or not the data of the 8-bit device-unique ID response transferred to the reception register 307 illustrated in FIG. 3 in S12 is zero ("0000 0000" in binary) (S13 in FIG. 14). This process is a process of determining whether or not the device-unique ID of any of the second SPI slave devices 103 corresponds to the 8-bit data of a searching device-unique ID that was transmitted eight bits earlier.

When the determination is Yes in S13, the microcomputer core 301 determines whether or not the value of a variable of "search ID transmission completion flag" in a memory is one (S14 in FIG. 14).

When the determination is No in S14, the microcomputer core 301 returns to the process in S7 of FIG. 13 because comparison has not been completed for all the bits of the searching device-unique ID. In S7, the microcomputer core 301 again determines whether or not the bits of the searching device-unique ID stored in a memory (not illustrated) involve a portion that has not been transmitted to the transmission register 306 of FIG. 3 (S7 in FIG. 13). The microcomputer core 301 again executes processes in and after S8 in FIG. 13 when the determination in S7 is Yes.

When the bits of the searching device-unique ID stored in the memory do not involve a portion that has not been transmitted to the transmission register 306 of FIG. 3 (No in S7), the microcomputer core 301 updates the value of the search ID transmission completion flag in a memory (not illustrated) to one. Thereafter, the microcomputer core 301 again executes S9-S11 in FIG. 13 and S12-S13 in FIG. 14. A delay of eight bits of the reception shift register 303 occurs between the transmission of the last eight bits of a searching device-unique ID and the returning of the data of a device-unique ID response corresponding to the searching device-unique ID. Accordingly, by a series of the above processes in S9-S11 in FIG. 13 and S12-S13 in FIG. 14, the processes are performed for the reception and comparison of the data of the device-unique ID response of the last eight bits corresponding to the last eight bits of the searching device-unique ID. Note that while the data of the transmission shift register 302 illustrated in FIG. 3 is transmitted in S11 in FIG. 13, this data is not processed by the second SPI slave device 103, and thus the transmission causes no problems.

When the determination is Yes in S13 in FIG. 14 for the data of the device-unique ID response of the last eight bits, it means that all the bits of the searching device-unique ID correspond to all the bits of the device-unique ID of one of the second SPI slave devices 103.

When the microcomputer core 301 executes S14, the determination in S14 is Yes because the value of the variable of "search ID transmission completion flag" in a memory has been set to one when the determination becomes No in S7 in FIG. 13.

When the determination is Yes in S14, the microcomputer core 301 additionally registers the searching device-unique ID for which the transmission has been completed, in a table of array variables of "detected device-unique IDs" in a memory (not illustrated) (S15 in FIG. 14).

The microcomputer core 301 determines whether or not all the bits of the searching device-unique ID that is temporarily stored in the memory have become one ("1111 1111 . . . 1111 1111" in binary) (S16 in FIG. 14). Regarding searching device-unique IDs, it is recognized that the last device-unique ID that can be set is specified when it is initialized to zero in S1 in FIG. 13 and thereafter is incremented sequentially so that all the bit values are one.

Accordingly, when the determination is Yes in S16, the microcomputer core 301 terminates the device-unique ID searching process in S2 in FIG. 12, which is explained by the flowcharts in FIG. 13 through FIG. 15. As a result of this, the device-unique IDs of all the second SPI slave devices 103 that are connected to the SPI master device 101 are registered in the table of array variable of "detected device-unique IDs" in a memory (not illustrated).

S17, S19, S20 in FIG. 14 and S21 and S22 in FIG. 15 correspond to <Operation 5 of SPI master device 101> described in FIG. 5.

First, when not all the searching device-unique IDs have been specified (No in S16), the microcomputer core 301 adds one to the value of the searching device-unique ID temporarily stored in the memory so as to treat it as the next searching device-unique ID (S17 in FIG. 14). The microcomputer core 301 shifts to the process in S22 in FIG. 15. This process will be described later.

When the determination is No in S13 in FIG. 14 in a comparison process after the reception of the eight bits of a searching device-unique ID, the microcomputer core 301 performs the following processes. This case is a case where the data of the device-unique ID response of eight bits transferred to the reception register 307 in S12 in FIG. 14 is not zero ("0000 0000" in binary).

In such a case, the microcomputer core 301 stores, in a memory and as a "non-match position", the bit position in the searching device-unique ID corresponding to the position at which the value of the data of a device-unique ID response first becomes one counting from the MSB (S19 in FIG. 14). A case is assumed for example in which the searching device-unique ID temporarily stored in a memory is binary 64-bit data "0000 000000000000 . . . 00000000". It is assumed that the first eight bits of the data of the device-unique ID response corresponding to this searching device-unique ID is "0000 0000", which is detected as a correspondence while the next eight bits are "0001 1111", which is detected as a non-match. In such a case, the 52nd bit in which the value first becomes one counting from the least significant bit of the 63rd bit in the searching device-unique ID (the least significant bit is the zero-th bit) is stored as a "non-match position".

At this moment, the values at the corresponding bit positions of the device-unique IDs of all the second SPI slave devices 103 do not correspond at the "non-match position" from among pieces of 8-bit serial data of searching device-unique IDs that were previously transmitted by the SPI master device 101. In such a case, the searching process for the current searching device-unique ID is interrupted, and the next searching device-unique ID has to be set. In such a case, when a device-unique ID having the same value as the value at the bit position at a "non-match position" in the current searching device-unique ID is searched for as a searching device-unique ID, a non-match inevitably occurs in all the second SPI slave devices 103 at the "non-match position". Regardless of the values set in the bits lower than the "non-match position", a non-match occurs as long as the bit value of the "non-match position" remains unchanged. At this moment, the searching device-unique ID has been incremented from a value with all its bits being zero to a value with all its bits being one (see S17 in FIG. 14). Accordingly, in the following process, the value is calculated for the searching device-unique ID that is to be specified next in such a manner that the value increases and the value at the bit position corresponding to the "non-match position" becomes the current value for the value of the searching device-unique ID that is stored currently and temporarily in a memory.

In order to perform this process, the microcomputer core 301 determines whether or not the value is one at the bit position corresponding to the above "non-match position" of the searching device-unique ID that is temporarily stored in a memory (S20 in FIG. 14).

When the value is zero at the bit position corresponding to the above "non-match position" of the searching device-unique ID (No in S20), the microcomputer core 301 calculates, in the following manner, the searching device-unique ID that is to be specified next and temporarily stores it in a memory (S21 in FIG. 15).

(1) Bits up to the bit one bit higher than the "non-match position" starting from the MSB have the same values as the value of the corresponding bit in the current searching device-unique ID that is temporarily stored in the memory.

(2) The bit at the "non-match position" is one.

(3) All the bits lower than the "non-match position" are zero.

It is assumed for example that the current searching device-unique ID is 64-bit data of "0000 0001 0000 0000 . . . 0000 0000", the first eight bits of a device-unique ID response is "0000 0000", and the next eight bits are "0001 1111". In such a case, the "non-match position" is the 52nd bit counting from the 63rd bit from the MSB, and the value of the 52nd bit is zero. Therefore, the searching device-unique ID that is to be specified next is "0000 0001 0001 0000 . . . 0000 0000", which is a result of inverting the 52nd bit in the "non-match position" to one.

When the value at the bit position corresponding to the above "non-match position" of the searching device-unique ID is one (Yes in S20), the microcomputer core 301 performs the following process (S21a in FIG. 15). First, the microcomputer core 301 calculates the following first and second values, which have the same data lengths as that of the searching device-unique ID.

First value: the bits up to the bit of the "non-match position" starting from the MSB have the same values as the corresponding bit values in the current searching device-unique ID that is temporarily stored in a memory, and all the bits lower than the "non-match position" are zero.

Second value: only the bit of the "non-match position" is one and all the other bits are zero.

The microcomputer core 301 adds the first and second values so as to treat the result of the addition as the searching device-unique ID that is to be specified next, and temporarily stores it in a memory.

It is assumed for example that the current searching device-unique ID is 64-bit data of "0000 0001 0001 0000 . . . 0000 0000", the first eight bits of a device-unique ID response is "0000 0000" and the next eight bits are "0001 1111". In such a case, the first value is "0000 0001 0001 0000 . . . 0000 0000" and the second value is "0000 0000 0001 0000 . . . 0000 0000". As a result of adding these two values, the searching device-unique ID that is to be specified next becomes "0000 0001 0010 0000 . . . 0000 0000".

After S21 or S21a, the microcomputer core 301 controls the SS signal and a CLK signal similarly to S3 and S4 in FIG. 13 (S22 in FIG. 15). That is, the microcomputer core 301 generates a signal that keeps an SS signal output through the SS terminal of FIG. 3 at a low level for the length of one clock of a CLK signal output through the CLK terminal of FIG. 3. Specifically, the microcomputer core 301 sets a low-level value in the general-purpose one-bit register 308 (#2) illustrated in FIG. 3. Then, the microcomputer core 301 controls the general-purpose one-bit register 308 (#0) of FIG. 3 so as to make it output a CLK signal only for one cycle via the clock output control circuit 305 (#0). Further, the microcomputer core 301 sets a high-level value in the general-purpose one-bit register 308 (#2) illustrated in FIG. 3, and thereby performs control of making the SS signal become a high level.

After the process in S22, the microcomputer core 301 returns to the process in S3 in FIG. 13 so as to continue the searching process for the searching device-unique ID that has been specified newly.

FIG. 16 and FIG. 17 are flowcharts explaining a detailed example of the bus-unique ID setting process in S4 in FIG. 12. This process corresponds to the bus-unique ID setting process by the SPI master device 101 described in FIG. 6.

First, the microcomputer core 301 determines the "length of bus-unique ID" (S1 in FIG. 16). When the number of the second SPI slave devices 103 connected to the SPI master device 101 is for example 63 or smaller, the "length of bus-unique ID" is six bits, and when the number is for example 319 (=63+256) or greater, the "length of bus-unique ID" is 14 bits. The former or a 6-bit length is referred to as data length type 1 and the latter or a 14-bit length is referred to as data length type 2. Note that the "length of bus-unique ID" may be longer than the above two types and a value equal to or greater than three may be defined as the data length type.

The microcomputer core 301 sets the initial value of a variable of "bus-unique ID to be assigned" that is stored in a memory (not illustrated) and that stores the ordinal number of a bus-unique ID to be assigned (S2 in FIG. 16).

The microcomputer core 301 obtains the device-unique ID of the second SPI slave device 103 from the entry with the ordinal number specified by the variable of "bus-unique ID to be assigned" in the table of array variables of "detected device-unique ID" in a memory (see S15 in FIG. 14). The microcomputer core 301 treats this device-unique ID as the setting device-unique ID described in FIG. 6, and sets it as a variable of "ID to be assigned" that is stored in a memory (S3 in FIG. 16).

The microcomputer core 301 performs control of the SS signal and a CLK signal (S4 in FIG. 16). This process corresponds to <Operation 1 of SPI master device 101> described in FIG. 6. That is, the microcomputer core 301 generates a signal that keeps an SS signal output through the SS terminal of FIG. 3 at a low level for the length of one clock of a CLK signal output through the CLK terminal of FIG. 3. Specifically, the microcomputer core 301 sets a low-level value in the general-purpose one-bit register 308 (#2) illustrated in FIG. 3. Then, the microcomputer core 301 controls the general-purpose one-bit register 308 (#0) of FIG. 3 so as to make it output a CLK signal for one cycle via the clock output control circuit 305 (#0).

After the control of the SS signal for the length of one clock in S4, the microcomputer core 301 performs control by which the SS signal is made to become a high level (S5 in FIG. 16). This process corresponds to <Operation 1 of SPI master device 101> described in FIG. 6. Specifically, the microcomputer core 301 sets a high-level value in the general-purpose one-bit register 308 (#2) illustrated in FIG. 3.

In the transmission register 306 of FIG. 3, the microcomputer core 301 sets "01" in the higher two bits as the value of the ID setting command described in FIG. 6 and sets the higher six bits of the "bus-unique ID to be assigned" in the lower six bits (S6 in FIG. 16). This process corresponds to <Operation 2 of SPI master device 101> described in FIG. 6.

The microcomputer core 301 transfers, to the transmission shift register 302, 8-bit data containing the ID setting command that was set in the transmission register 306 of FIG. 3 in S6 (S7 in FIG. 16). This process corresponds to <Operation 2 of SPI master device 101> described in FIG. 6.

The microcomputer core 301 performs an output process of the 8-bit data containing the ID setting command (S8 in FIG. 16). This process corresponds to <Operation 2 of SPI master device 101> described in FIG. 6. Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1). As a result of this, the 8-bit data containing the ID setting command transferred to the transmission shift register 302 in S7 is sequentially output as the serial data (which corresponds to the data 601 of FIG. 6) through the MOSI terminal. At the same time, the serial data of eight bits that is sequentially input through the MISO terminal is sequentially stored in the reception shift register 303.

S9-S11 in FIG. 17 correspond to <Operation 3 of SPI master device 101> described in FIG. 6.

First, the microcomputer core 301 sets, for the transmission register 306 of FIG. 3, the eight bits of the device-unique ID, stored in the "ID to be assigned" in S3 in FIG. 16, that was detected as an ID corresponding to the "bus-unique ID to be assigned". Further, the microcomputer core 301 transfers, to the transmission shift register 302, the 8-bit data of the device-unique ID set in the transmission register 306 (S9 in FIG. 17).

The microcomputer core 301 performs an output process of the 8-bit data of the setting device-unique ID (S10 in FIG. 17). Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1). As a result of this, the 8-bit data of the setting device-unique ID transferred to the transmission shift register 302 in S9 is sequentially output as the serial data (which corresponds to the data 602 of FIG. 6) through the MOSI terminal. At the same time, the serial data of eight bits that is sequentially input through the MISO terminal is sequentially stored in the reception shift register 303.

Thereafter, the microcomputer core 301 determines whether or not all the bits in the device-unique ID stored in the "ID to be assigned" in S3 in FIG. 16 have been set in the transmission register 306 of FIG. 3 (S11 in FIG. 17). When the determination is No in S11, the microcomputer core 301 returns to the process in S9 and continues the transmission process of the setting device-unique ID in units of eight bits.

When the transmission of all the bits of the setting device-unique ID has been terminated so that the determination becomes Yes in S11, the microcomputer core 301 performs the processes in S12-S17 in FIG. 17. These processes correspond to <Operation 4 of SPI master device 101> described in FIG. 6. In such a case, the microcomputer core 301 performs the processes in S12-S17 when the data length type of the bus-unique ID set in S1 in FIG. 16 is equal to two or more. When the data length type is one, the serial data 603 is not needed and the serial data 601 alone is sufficient, and thus the processes in S12-S17 are skipped.

First, the microcomputer core 301 sets, in the transmission register 306 of FIG. 3, the eight bits counting from the higher side of the bus-unique ID stored in the variable of "bus-unique ID to be assigned" in a memory. Further, the microcomputer core 301 transfers, to the transmission shift register 302, the 8-bit data of the bus-unique ID set in the transmission register 306 (S12 in FIG. 17).

The microcomputer core 301 performs an output process of the 8-bit data of the bus-unique ID (S13 in FIG. 17). Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1). As a result of this, the 8-bit data of the bus-unique ID transferred to the transmission shift register 302 in S9 is sequentially output as the serial data (which corresponds to the data 603 of FIG. 6) through the MOSI terminal. At the same time, the serial data of eight bits that is sequentially input through the MISO terminal is sequentially stored in the reception shift register 303.

The microcomputer core 301 transfers 8-bit response data stored in the reception shift register 303 to the reception register 307 illustrated in FIG. 3 (S14 in FIG. 17).

The microcomputer core 301 determines whether or not the content transferred to the reception register 307 is zero (S15 in FIG. 17). In this situation, when the second SPI slave device 103 receives a setting device-unique ID from the SPI master device 101 and the received ID corresponds to the device-unique ID of the second SPI slave device 103 itself or when the second SPI slave device 103 receives a bus-unique ID, the second SPI slave device 103 returns response serial data at a low level. When the response data transferred to the reception register 307 is not zero (No in S15), the microcomputer core 301 determines that there is no response from the second SPI slave device 103 corresponding to the setting device-unique ID and that a failure occurred. In such a case, the microcomputer core 301 ignores that second SPI slave device 103, shifts to S17a, and shifts to the process for the next second SPI slave device 103.

When the determination is Yes in S15, the microcomputer core 301 determines whether or not all the bits of the bus-unique ID stored in the variable of "bus-unique ID to be assigned" in a memory have been transmitted (S16 in FIG. 17).

When the determination is No in S16, the microcomputer core 301 returns to the process in S12 so as to continue the transmission process for the remaining bits of the bus-unique ID.

When the determination becomes Yes in S16, the microcomputer core 301 performs the reception process for the last 8-bit data (S17 in FIG. 17). Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1). As a result of this, the 8-bit data of the transmission shift register 302 illustrated in FIG. 3 is sequentially output as serial data through the MOSI terminal. At the same time, the serial data of eight bits that is sequentially input through the MISO terminal is sequentially stored in the reception shift register 303.

The microcomputer core 301 performs control of an SS signal and a CLK signal (S17a in FIG. 17). This process corresponds to <Operation 5 of SPI master device 101> described in FIG. 6. That is, the microcomputer core 301 generates a signal that keeps an SS signal output through the SS terminal of FIG. 3 at a low level for the length of one clock of a CLK signal output through the CLK terminal of FIG. 3. Specifically, the microcomputer core 301 sets a low-level value in the general-purpose one-bit register 308 (#1) illustrated in FIG. 3. Then, the microcomputer core 301 controls the general-purpose one-bit register 308 (#0) of FIG. 3 so as to make it output a CLK signal for one cycle via the clock output control circuit 305 (#0). Further, the microcomputer core 301 sets a high-level value in the general-purpose one-bit register 308 (#2) illustrated in FIG. 3, and thereby performs control of making the SS signal become a high level.

After the above process, the microcomputer core 301 increments, by one, the value of the variable of "device-unique ID to be assigned" in a memory, and uses that value to access an unprocessed entry in the table of an array variable of "detected device-unique ID" in a memory (S17b in FIG. 17).

By determining whether or not the above access failed, the microcomputer core 301 determines whether or not bus-unique IDs have been set for all the registered second SPI slave devices 103 (S18 in FIG. 17).

When the determination is No in S18, the microcomputer core 301 returns to the process in S3, and continues the bus-unique ID for the second SPI slave device 103 that corresponds to a new setting device-unique ID.

When the determination becomes Yes in S18, the microcomputer core 301 terminates the bus-unique ID in S4 in FIG. 12 appearing in the flowcharts in FIG. 16 and FIG. 17.

Figure 18:
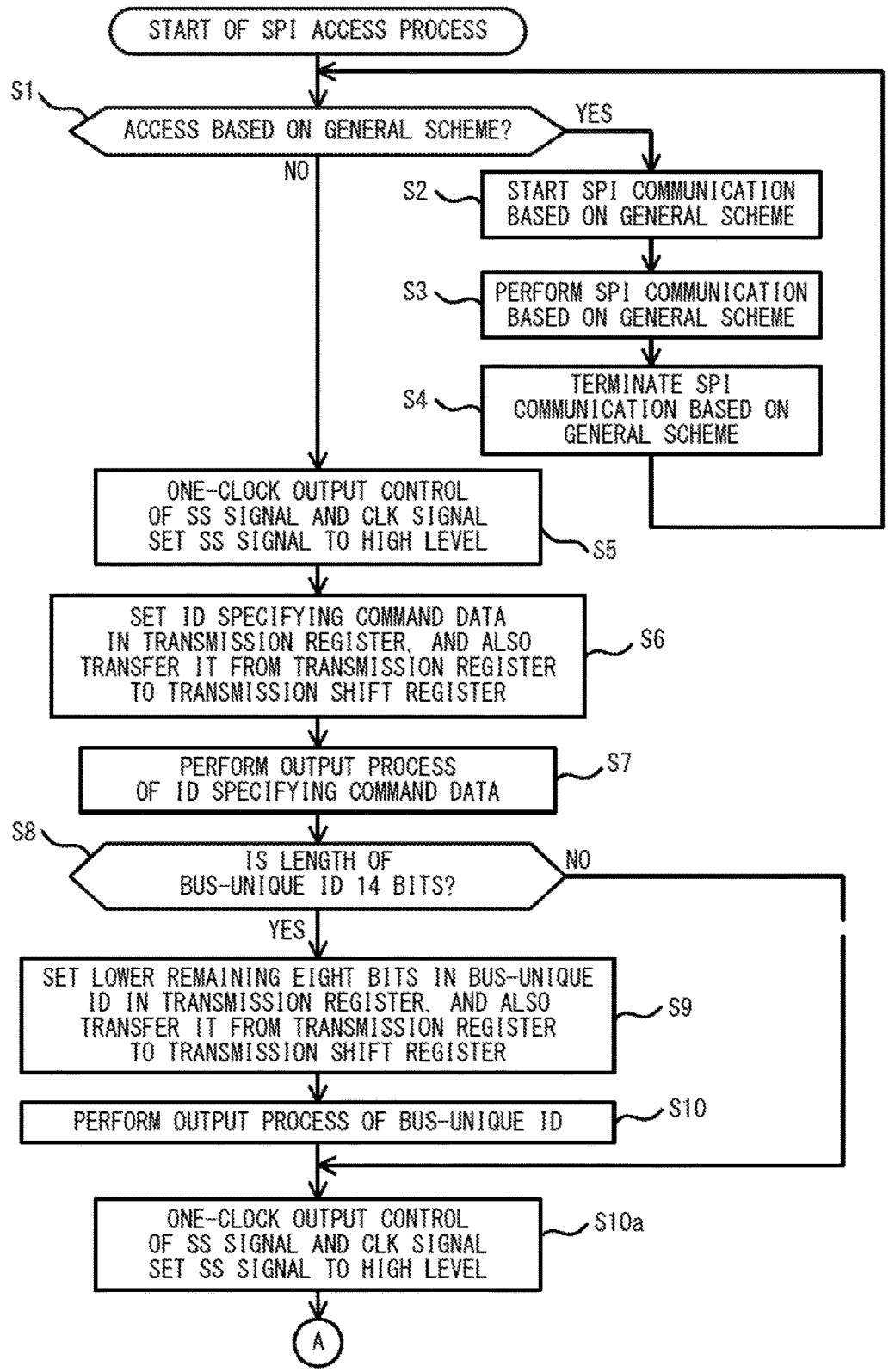
FIG. 18 and FIG. 19 are flowcharts explaining a detailed example of an SPI access process.
Figure 19:
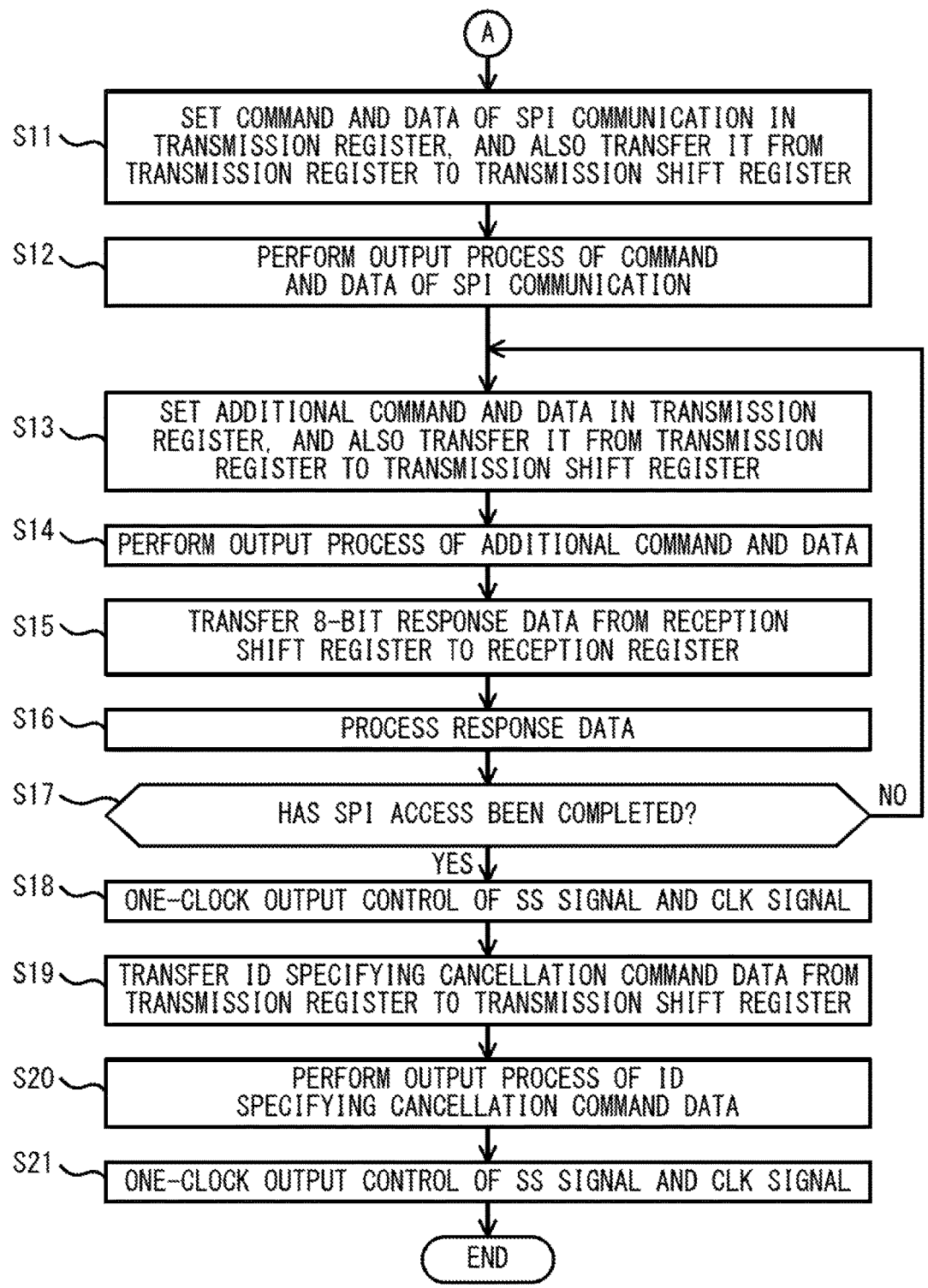

FIG. 18 and FIG. 19 are flowcharts explaining a detailed example of an SPI access process in S5 in FIG. 12. This process includes an SPI communication process that uses the bus-unique ID described in FIG. 7, and includes an SPI access process for the first SPI slave device 102 based on a general scheme in addition to an SPI access process for the second SPI slave device 103 that operates based on the extended scheme.

First, the microcomputer core 301 determines whether or not an access occurred to the first SPI slave device 102 based on a general scheme (S1 in FIG. 18).

When the determination is Yes in S1, the microcomputer core 301 starts an SPI communication based on a general scheme (S2 in FIG. 18). Specifically, the microcomputer core 301 sets a low-level value in the general-purpose one-bit register 308 (#2) in FIG. 3, and makes the SS signal output through the SS terminal become a low level. Also, the microcomputer core 301 controls the general-purpose one-bit register 308 (#0) in FIG. 3 so as to make the clock output control circuit 305 output CLK signals to the CLK terminal continuously.

The microcomputer core 301 conducts an SPI communication based on a general scheme (S3 in FIG. 18). Detailed explanations for this will be omitted.

For terminating an SPI communication based on a general scheme (S4 in FIG. 18), the microcomputer core 301 sets a high-level value in the general-purpose one-bit register 308 (#2) and makes the SS signal output from the SS terminal become a high level. Thereafter, the microcomputer core 301 returns to the process in S1.

When the determination is No in S1, the microcomputer core 301 starts an SPI communication based on the extended scheme. First, the microcomputer core 301 performs control of an SS signal and a CLK signal (S5 in FIG. 18). This process corresponds to <Operation 1 of SPI master device 101> described in FIG. 7. That is, the microcomputer core 301 generates a signal that keeps an SS signal output through the SS terminal of FIG. 3 at a low level for the length of one clock of a CLK signal output through the CLK terminal of FIG. 3. Specifically, the microcomputer core 301 sets a low-level value in the general-purpose one-bit register 308 (#2) illustrated in FIG. 3. Then, the microcomputer core 301 controls the general-purpose one-bit register 308 (#0) of FIG. 3 so as to make it output a CLK signal only for one cycle via the clock output control circuit 305 (#0). Thereafter, the microcomputer core 301 sets a high-level value in the general-purpose one-bit register 308 (#2) illustrated in FIG. 3 and makes the SS signal output from the SS terminal become a high level.

The microcomputer core 301 sets "10" as a value of the ID-specifying command described in FIG. 7 in the higher two bits and sets, in the lower six bits, the values in the higher six bits of the bus-unique ID that is to be set. Then, the microcomputer core 301 transfers, to the transmission shift register 302, 8-bit data containing the ID-specifying command set in the transmission register 306 (S6 in FIG. 18). This process corresponds to <Operation 2 of SPI master device 101> described in FIG. 7.

The microcomputer core 301 performs an output process of the 8-bit data containing the ID-specifying command (S7 in FIG. 18). This process corresponds to <Operation 2 of SPI master device 101> described in FIG. 7. Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 from the clock output control circuit 305 (#1). As a result of this, the 8-bit data containing the ID-specifying command transferred to the transmission shift register 302 in S6 is sequentially output as the serial data (which corresponds to the data 701 of FIG. 7) through the MOSI terminal.

S8-S10 in FIG. 18 correspond to <Operation 3 of SPI master device 101> described in FIG. 7.

First, the microcomputer core 301 determines whether or not the data length of the bus-unique ID is fourteen bits (see S1 in FIG. 16) (S8 in FIG. 18). When the determination is No in S8, the data length of the bus-unique ID is six bits, and S9 and S10 are skipped so that the process shifts to S10a of FIG. 18 because the transmission has been completed in S6 and S7.

When the determination is Yes in S8, the microcomputer core 301 sets, in the transmission register 306 of FIG. 3, the lower eight bits remaining in the bus-unique ID. Then, the microcomputer core 301 transfers, to the transmission shift register 302, the 8-bit data of the bus-unique ID set in the transmission register 306 (S9 in FIG. 18). This process corresponds to <Operation 3 of SPI master device 101> described in FIG. 7.

The microcomputer core 301 performs an output process of the 8-bit data containing the bus-unique ID (which corresponds to serial data 703 in FIG. 7) (S10 in FIG. 18). This process is similar to S7 in FIG. 18 that was described above.

The microcomputer core 301 performs control of an SS signal and a CLK signal (S10a in FIG. 18). This process corresponds to <Operation 4 of SPI master device 101> described in FIG. 7. That is, the microcomputer core 301 generates a signal that keeps an SS signal output through the SS terminal of FIG. 3 at a low level for the length of one clock of a CLK signal output through the CLK terminal of FIG. 3. Specifically, the microcomputer core 301 sets a low-level value in the general-purpose one-bit register 308 (#2) illustrated in FIG. 3. Then, the microcomputer core 301 controls the general-purpose one-bit register 308 (#0) of FIG. 3 so as to make it output a CLK signal for one cycle via the clock output control circuit 305 (#0). Further, the microcomputer core 301 sets a high-level value in the general-purpose one-bit register 308 (#2) illustrated in FIG. 3, and thereby performs control of making the SS signal become a high level.

Thereafter, the SPI master device 101 transmits serial data of an SPI communication (which corresponds to the data 703 of FIG. 7) through the MOSI terminal of FIG. 3 in synchronization with the CLK signal output through the CLK terminal of FIG. 3, through a series of processes in S11-S17 in FIG. 19 below. This process corresponds to <Operation 4 of SPI master device 101> described in FIG. 7.

First, the microcomputer core 301 sets, in the transmission register 306 of FIG. 3, a command, data, etc. that are transmitted in an SPI communication, and transfers the content of this transmission register 306 to the transmission shift register 302 (S11 in FIG. 19).

The microcomputer core 301 performs an output process of 8-bit data containing the command, data, etc. to be transmitted (S12 in FIG. 19). Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 from the clock output control circuit 305 (#1). As a result of this, the 8-bit data containing the command, data, etc. to be transmitted is sequentially output as the serial data (which corresponds to the data 703 of FIG. 7) through the MOSI terminal, the 8-bit data having been transferred to the transmission shift register 302 in S11.

As necessary, the microcomputer core 301 further sets, in the transmission register 306 of FIG. 3, a command, data, etc. that are to be transmitted additionally in an SPI communication, and transfers the content of this transmission register 306 to the transmission shift register 302 (S13 in FIG. 19).

The microcomputer core 301 performs an output process of the 8-bit data containing the command, data, etc. that are to be additionally transmitted (S14 in FIG. 19). Specifically, by controlling the general-purpose one-bit register 308 (#0), the microcomputer core 301 outputs a CLK signal of eight bits through the CLK terminal from the clock output control circuit 305 (#0). Also, by controlling the general-purpose one-bit register 308 (#1), the microcomputer core 301 outputs a CLK signal of eight bits to the transmission shift register 302 and the reception shift register 303 from the clock output control circuit 305 (#1). As a result of this, the 8-bit data containing the command, data, etc. to be additionally transmitted is sequentially output as the serial data (which corresponds to the data 703 of FIG. 7) through the MOSI terminal, the 8-bit data having been transferred to the transmission shift register 302 in S13. At the same time, the serial data of eight bits that is sequentially input through the MISO terminal is sequentially stored in the reception shift register 303.

The microcomputer core 301 transfers 8-bit response data stored in the reception shift register 303 to the reception register 307 illustrated in FIG. 3 (S15 in FIG. 19). The microcomputer core 301 processes the response data transferred to the reception register 307 (S16 in FIG. 19).

The microcomputer core 301 determines whether or not an SPI access to the second SPI slave device 103 has been completed (S17 in FIG. 19). When the SPI access has not been completed (No in S17), the microcomputer core 301 returns to the process in S13 in FIG. 19 so as to continue the SPI access. When the SPI access is completed (Yes in S17), the microcomputer core 301 performs a one-clock-length output control of an SS signal and a CLK signal similarly to S5 in FIG. 18 (S18 in FIG. 19). This process corresponds to <Operation 5 of SPI master device 101> described in FIG. 7.

In the transmission register 306 of FIG. 3, the microcomputer core 301 sets "10" in the higher two bits as the value of the ID setting command described in FIG. 7 and sets "000000" in the lower six bits. This 8-bit data functions as an ID-specifying cancellation command. Then, the microcomputer core 301 transfers, to the transmission shift register 302, 8-bit data containing the ID-specifying cancellation command that was set in the transmission register 306 (S19 in FIG. 19). This process corresponds to <Operation 5 of SPI master device 101> described in FIG. 7.

The microcomputer core 301 performs an output process of the 8-bit data containing the ID-specifying command (S20 in FIG. 19). This process is similar to S7 described in FIG. 18. Thereafter, the microcomputer core 301 performs a one-clock-length output control of an SS signal and a CLK signal similarly to S5 in FIG. 18 (S21 in FIG. 19). This process corresponds to <Operation 4 of SPI master device 101> described in FIG. 7.

Figure 20:
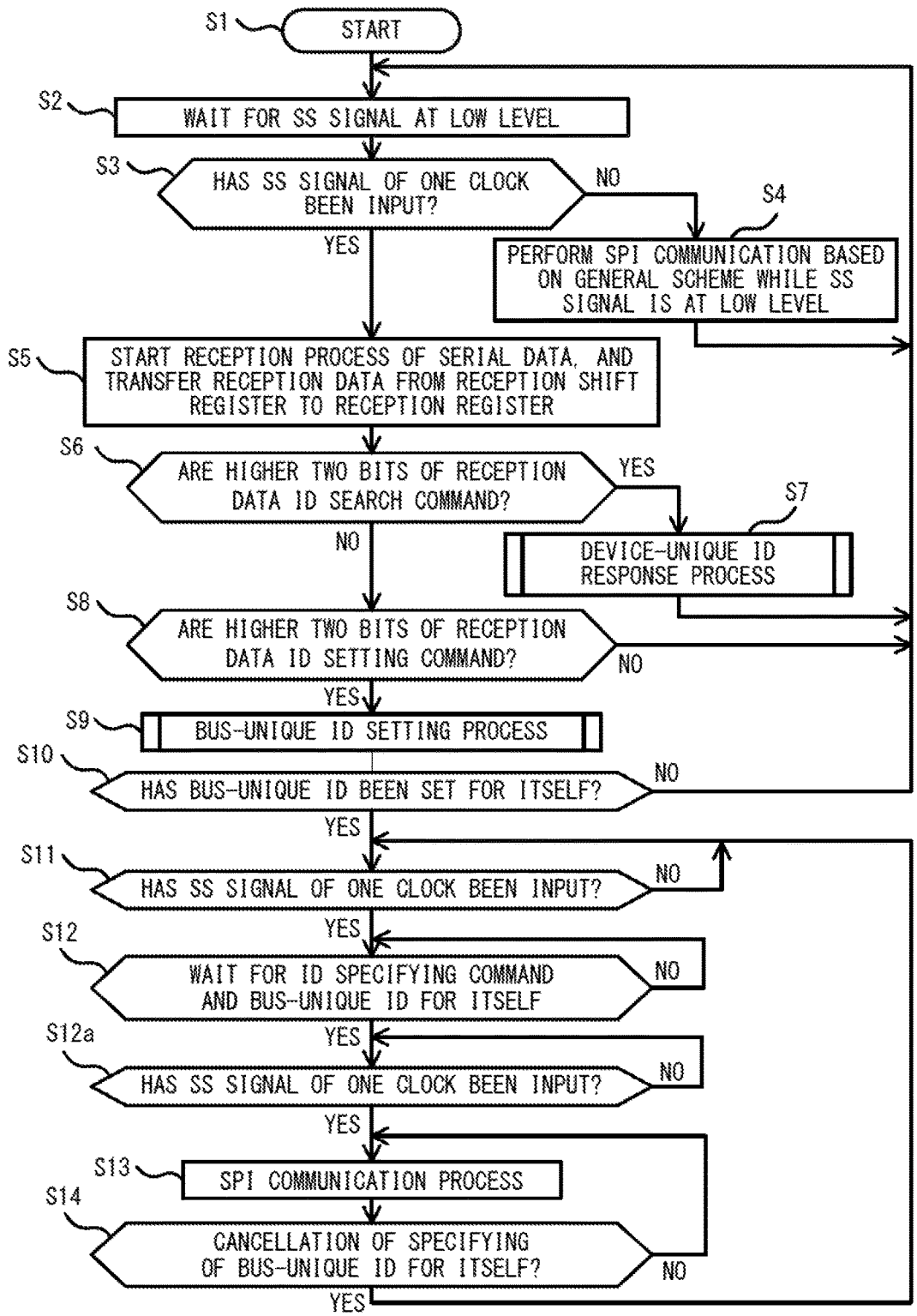
FIG. 20 is a flowchart explaining an example of an overall control process that is performed by the second SPI slave device.

FIG. 20 is a flowchart explaining an example of an overall control process that is performed by the second SPI slave device 103.

The microcomputer core 401 illustrated in FIG. 4 starts a control process for an SPI interface (S1 in FIG. 20). When resetting is performed at an arbitrary timing by the resetting process described in FIG. 8, the process starts from S1.

The microcomputer core 401 monitors the value of the general-purpose one-bit register 408 (#3) illustrated in FIG. 4 and thereby waits until the SS signal input through the SS terminal becomes a low level (S2 in FIG. 20).

When the SS signal becomes a low level, the microcomputer core 401 performs the following processes. The microcomputer core 401 transfers output of the one-clock decision circuit 404 of FIG. 4 to the general-purpose one-bit register 408 (#0) so as to decide whether or not a communication-starting state has started in response to the inputting of the SS signal of one clock (S3 in FIG. 20).

When the determination is No in S3, the microcomputer core 401 monitors the value of the general-purpose one-bit register 408 (#3) of FIG. 4, and thereby conducts a communication with the SPI master device 101 as an SPI slave device based on a general scheme similar to that of the first SPI slave device 102 while the SS signal input through the SS terminal is at a low level (S4 in FIG. 20).

The microcomputer core 401 monitors the value of the general-purpose one-bit register 408 (#3) of FIG. 4, and thereby returns to the monitoring process in S2 when the state of a low level of the SS signal input through the SS terminal is cancelled and the signal becomes a high level.

When the SS signal becomes a low level in S2 and it is determined that the SS signal of one clock has been input by the general-purpose one-bit register 408 (#0) (Yes in S3 in FIG. 20), the microcomputer core 401 determines that it is a state of the start of a communication based on the extended scheme. This process corresponds to <Operation 1 of second SPI slave device 103> described in FIG. 5, FIG. 6 or FIG. 7.

In such a case, the microcomputer core 401 resets the content of the general-purpose one-bit register 408 (#0) and thereafter performs a reception process of serial data input through the MOSI terminal (S5 in FIG. 20). Specifically, by controlling the general-purpose one-bit register 408 (#1), the microcomputer core 401 outputs a CLK signal of eight bits to the transmission shift register 403 and the reception shift register 402 from the clock output control circuit 405. As a result of this, the serial data of eight bits that is sequentially input through the MOSI terminal is sequentially stored in the reception shift register 402. Further, the microcomputer core 401 transfers the 8-bit data stored in the reception shift register 402 to the reception register 406 of FIG. 4.

Next, the microcomputer core 401 determines whether or not the higher two bits transferred to the reception register 406 are "00" as an ID search command (S6 in FIG. 20).

When the determination is Yes in S6, the microcomputer core 401 performs a device-unique ID response process (S7 in FIG. 20). This process corresponds to <Operation 2 of second SPI slave device 103> described in FIG. 5. This process will be described later in detail by referring to the flowchart illustrated in FIG. 21. After the process in S7, the microcomputer core 401 returns to the monitoring process in S2.

When the determination is No in S6, the microcomputer core 401 determines whether or not the higher two bits transferred to the reception register 406 are "01" as an ID setting command (S8 in FIG. 20). When the determination is No in S8, the microcomputer core 401 returns to the monitoring process in S2.

When the determination is Yes in S8, the microcomputer core 401 performs a bus-unique ID setting process (S9 in FIG. 20). This process corresponds to <Operation 2 of second SPI slave device 103> described in FIG. 6. This process will be described later in detail by referring to the flowchart illustrated in FIG. 22.

After the process in S9, the microcomputer core 401 determines whether or not a bus-unique ID has been set for the microcomputer core 401 itself in S9 (S10 in FIG. 20). When the determination is No in S10, the microcomputer core 401 returns to the monitoring process in S2.

When the determination is Yes in S10, the reception shift register 402 performs the following processes. The microcomputer core 401 transfers output of the one-clock decision circuit 404 of FIG. 4 to the general-purpose one-bit register 408 (#0) so as to perform determination, and waits for a communication-starting state to start in response to the inputting of the SS signal of one clock (determination in S11 in FIG. 20 is No continuously). This process corresponds to <Operation 1 of second SPI slave device 103> described in FIG. 7.

When the determination becomes Yes in S11, the microcomputer core 401 inputs the serial data input through the MOSI terminal of FIG. 4 to the reception shift register 402 so as to transfer it to the reception register 406 in a process similar to that in S5. The microcomputer core 401 waits until it becomes a situation where the higher two bits of the data transferred to the reception register 406 is "10" as an ID-specifying command and the bus-unique ID registered for the reception register 406 itself as a bus-unique ID that was sequentially received is specified (the determination in S12 in FIG. 20 is No continuously). This process corresponds to <Operation 2 of second SPI slave device 103> and <Operation 3 of second SPI slave device 103> described in FIG. 7.

When the determination becomes Yes in S12, the microcomputer core 401 performs the following processes. The microcomputer core 401 transfers output of the one-clock decision circuit 404 of FIG. 4 to the general-purpose one-bit register 408 (#0) so as to perform determination, and thereby waits until a communication-possible state starts in response to the inputting of the SS signal of one clock (determination in S12a in FIG. 20 is No continuously). This process corresponds to <Operation 4 of second SPI slave device 103> described in FIG. 7.

When the determination becomes Yes in S12a, the microcomputer core 401 enters an SPI-communication-possible state (S13 in FIG. 20). In an SPI-communication-possible state, the microcomputer core 401 performs an SPI communication with the value of the general-purpose one-bit register 408 (#3) at a high level, i.e., with the SS signal input through the SS terminal at a high level. In such a case, the microcomputer core 401 receives and processes serial data (which corresponds to the data 703 in FIG. 7) of an SPI communication input through the MOSI terminal in units of eight bits in synchronization with the CLK signal of FIG. 7 input through the CLK terminal of FIG. 4. Also, as necessary, the microcomputer core 401 transmits serial data (which corresponds to the data 704 in FIG. 7) of an SPI communication through the MISO terminal of FIG. 4 in units of eight bits in synchronization with the CLK signal input through the CLK terminal of FIG. 4. These processes correspond to <Operation 4 of second SPI slave device 103> described in FIG. 7. Specifically, by controlling the general-purpose one-bit register 408 (#1), the microcomputer core 401 outputs a CLK signal of eight bits to the transmission shift register 403 and the reception shift register 402 from the clock output control circuit 405. As a result of this, the serial data of eight bits that is sequentially input through the MOSI terminal is sequentially stored in the reception shift register 402, and is sequentially transferred to the reception register 406. Further, the data set in the transmission shift register 403 is sequentially transmitted from the transmission register 407 as serial data of eight bits through the MISO terminal.

The microcomputer core 401 determines whether or not it has been instructed by the SPI master device 101 to cancel the specifying of the bus-unique ID in the microcomputer core 401 itself (S14 in FIG. 20). Specifically, the microcomputer core 401 transfers an output of the one-clock decision circuit 404 of FIG. 4 to the general-purpose one-bit register 408 (#0) so as to determine whether or not a communication-starting state has been specified in response to the inputting of the SS signal of one clock. When this determination becomes Yes, the microcomputer core 401 inputs the serial data input through the MOSI terminal of FIG. 4 to the reception shift register 402 so as to transfer it to the reception register 406 in a process similar to that in S5. The microcomputer core 401 waits until it becomes a situation where the higher two bits of the data transferred to the reception register 406 is "10" as an ID-specifying command and the lower six bits have become "000000" so that the ID-specifying cancellation has been specified. Alternatively, the microcomputer core 401 determines whether or not it has become a situation where the higher two bits of the data transferred to the reception register 406 is "10" as an ID-specifying command and the bus-unique ID other than the bus-unique ID set for the microcomputer core 401 itself has been specified. After the above determinations, the microcomputer core 401 transfers an output of the one-clock decision circuit 404 of FIG. 4 to the general-purpose one-bit register 408 (#0) so as to perform determination, and waits until it becomes a communication-termination state in response to the inputting of the SS signal of one clock and terminates the determination process in S14.

When at least one of the above determinations is No as a result of the process in S14, the microcomputer core 401 returns to the SPI-communication-possible state in S13. When all determinations become Yes as a result of the process in S14, the microcomputer core 401 terminates the SPI-communication-possible state, and returns to the detection process of the communication-starting state in S11.

When detecting "11" as the resetting command described in FIG. 8, the microcomputer core 401 cancels (clears the setting in a memory (not illustrated)) the registration of the bus-unique ID for the microcomputer core 401 itself in the command determination process in S12, and returns to the starting state in S1.

Figure 21:
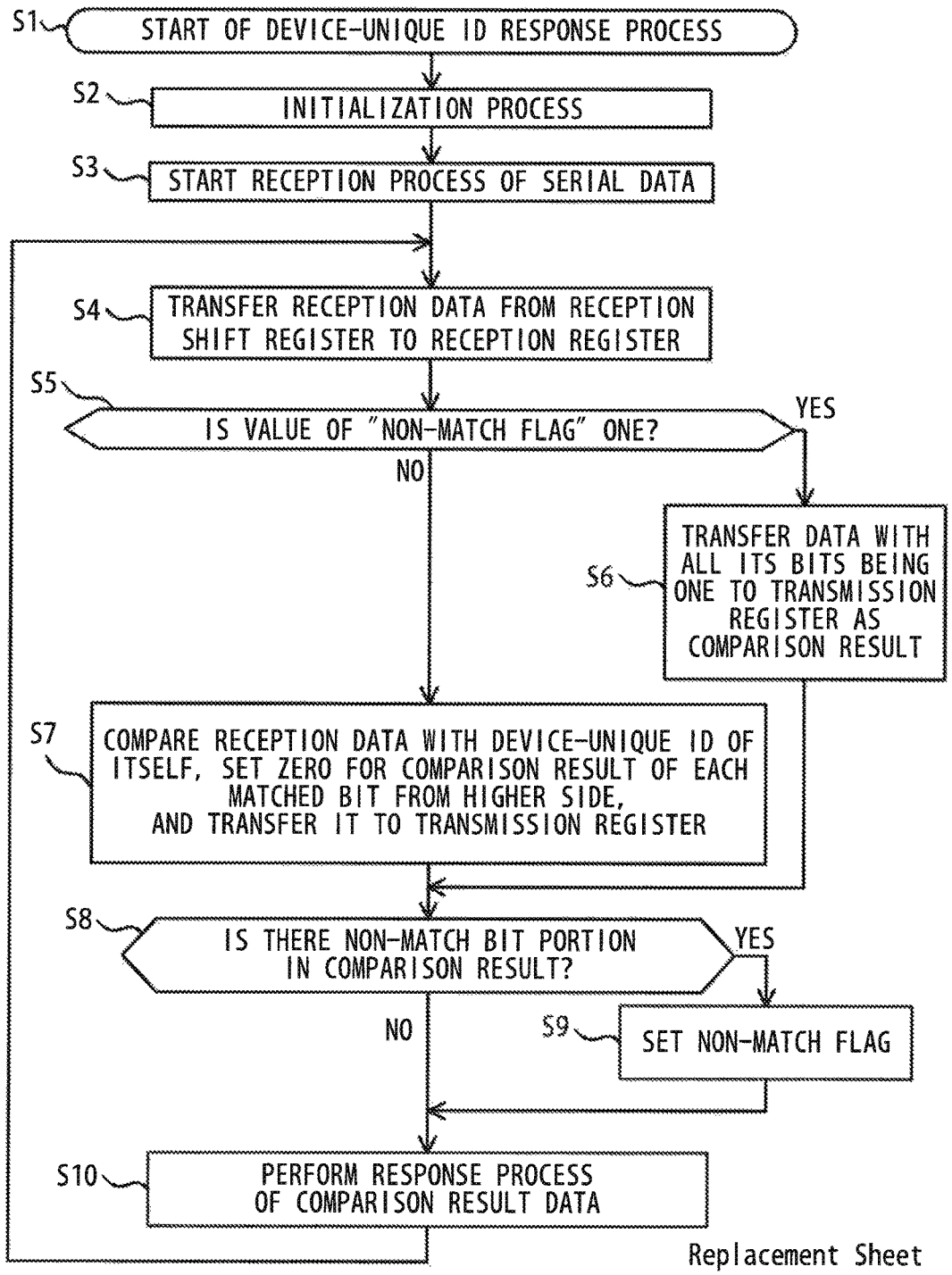
FIG. 21 is a flowchart explaining a detailed example of a device-unique ID response process.

FIG. 21 is a flowchart explaining a detailed example of a device-unique ID response process in S7 in FIG. 20.

The microcomputer core 401 illustrated in FIG. 4 starts a device-unique ID response process (S1 in FIG. 21). The microcomputer core 401 first performs an initialization process (S2 in FIG. 21). Specifically, the microcomputer core 401 clears the "non-match flag" stored in a memory (not illustrated), the flag being described later. Also, the microcomputer core 401 conducts setting so that an interrupt process occurs when a value of one is set for the general-purpose one-bit register 408 (#0) from the one-clock decision circuit 404 of FIG. 4. This interrupt process will be described later.

A series of the processes from S3-S10 in FIG. 21, which will be explained below, corresponds to <Operation 3 of second SPI slave device 103> described in FIG. 5.

The microcomputer core 401 enters a state in which it waits to receive the serial data input through the MOSI terminal of FIG. 4 (S3 in FIG. 21). Specifically, by controlling the general-purpose one-bit register 408 (#1), the microcomputer core 401 outputs a CLK signal of eight bits from the clock output control circuit 405 (#0) to the transmission shift register 403 and the reception shift register 402. As a result of this, the serial data of eight bits that is sequentially input through the MOSI terminal is sequentially stored in the reception shift register 402. Thereafter, the microcomputer core 401 transfers the content of the reception shift register 402 of FIG. 4 to the reception register 406 (S4 in FIG. 21).

The microcomputer core 401 determines whether or not a value of one is set in the "non-match flag" in a memory (S5 in FIG. 21). When the determination is Yes in S5, the microcomputer core 401 sets one in all the bits in the transmission register 407 of FIG. 4 ("1111 1111" in binary) as a comparison result (S6 in FIG. 21). Thereafter, the microcomputer core 401 shifts to S8, which will be described later.

When the determination is No in S5, the microcomputer core 401 compares new 8-bit data of a searching device-unique ID transmitted from the SPI master device 101 and received by the reception register 406 with the corresponding eight bits in the device-unique ID of the microcomputer core 401 itself (S7 in FIG. 21). The microcomputer core 401 conducts comparison sequentially from the MSB, and sets zero for the comparison results of the bits that have correspondences. The comparison results of the bits subsequent to a bit not having a correspondence are set to one. The microcomputer core 401 transfers the comparison result data of eight bits, thereby obtained to the transmission register 407 of FIG. 4.

After the process in S6 or S7, the microcomputer core 401 determines whether or not there is a non-match bit portion in the comparison result transferred to the transmission register 407 (S8 in FIG. 21). When the determination is Yes in S8, the microcomputer core 401 sets a value of one in the "non-match flag" in a memory (S9 in FIG. 21). When the determination is No in S8, the general-purpose one-bit register 408 skips S9.

Thereafter, the microcomputer core 401 performs a response process of comparison result data of eight bits (S10 in FIG. 21). Specifically, by controlling the general-purpose one-bit register 408 (∩1), the microcomputer core 401 outputs a CLK signal of eight bits to the transmission shift register 403 and the reception shift register 402 from the clock output control circuit 405. As a result of this, the comparison result data of eight bits transferred from the transmission register 407 to the transmission shift register 403 in S6 or S7 is sequentially output as serial data (which corresponds to data 504 and data 505 in FIG. 5) through the MISO terminal. At the same time, the serial data of eight bits (which corresponds to the data 502 in FIG. 5) that is sequentially input through the MISO terminal is sequentially stored in the reception shift register 402.

Thereafter, the microcomputer core 401 returns to the process in S4 in FIG. 21, and performs a response process of comparison result data that corresponds to new 8-bit data of the searching device-unique ID received by the reception shift register 402.

As described by referring to S7, the searching device-unique ID and the eight bits of the device-unique ID for the microcomputer core 401 itself are sequentially compared starting from the MSB, and zero is set for the comparison results of the bits that have correspondences while one is set for the comparison results of the bits subsequent to a bit not having a correspondence. When there is a non-match portion, the determination is Yes in S8, and a value of one is set in the "non-match flag" in S9. As described above, when a value of one is set once in the "non-match flag", the determination thereafter becomes Yes in S5 without exception and all of the eight bits of the comparison result become one, and control is performed so that meaningless comparisons are not conducted for the bits lower than the bit in which the non-match occurred.

Note that at a timing at which a bit having a value of one set in the transmission register 407 of FIG. 4 is output through the MISO terminal from the transmission shift register 403, the microcomputer core 401 makes the MISO terminal an open drain so as to make it enter a high impedance state.

When an interrupt process occurs with a value of one set in the general-purpose one-bit register 408 (#0) by the one-clock decision circuit 404 of FIG. 4 during an arbitrary process after S3 in FIG. 21 in the above device-unique ID response process, the microcomputer core 401 performs the following processes. The microcomputer core 401 determines that the state has entered a state of a communication termination, clears the general-purpose one-bit register 408 (#0) of FIG. 4, and changes the setting so that no interrupt processes will occur in that register. Thereafter, the microcomputer core 401 terminates the device-unique ID response process in S7 in FIG. 20 illustrated in the flowchart of FIG. 21 and returns to the monitoring process of S2 from S7 in FIG. 20.

FIG. 22 is a flowchart explaining a detailed example of a bus-unique ID setting process in S9 in FIG. 20.

The microcomputer core 401 illustrated in FIG. 4 starts a bus-unique ID setting process (S1 in FIG. 22). The microcomputer core 401 first performs an initialization process (S2 in FIG. 22). Specifically, the microcomputer core 401 conducts setting so that an interrupt process occurs when a value of one is set in the general-purpose one-bit register 408 (#0) by the one-clock decision circuit 404. In response to the occurrence of this interrupt process, the microcomputer core 401 shifts the control to stepA in FIG. 22. This interrupt process will be described later.

The microcomputer core 401 extracts the higher six bits of the bus-unique ID from the lower six bits of the 8-bit data (which corresponds to the data 601 in FIG. 6) containing "01" as an ID setting command set in the reception register 406 in S6 in FIG. 20. Then, the microcomputer core 401 additionally stores the extracted six bits in a variable of "bus-unique ID" in a memory (not illustrated) (S3 in FIG. 22). This process corresponds to <Operation 2 of second SPI slave device 103> described in FIG. 6.

The processes from S4-S10 in FIG. 22 correspond to <Operation 3 of second SPI slave device 103> described in FIG. 6.

The microcomputer core 401 enters a state in which it waits to receive the serial data for setting device-unique ID (which corresponds to the data 602 in FIG. 6) input through the MOSI terminal of FIG. 4 (S4 in FIG. 22). Specifically, by controlling the general-purpose one-bit register 408 (#1), the microcomputer core 401 outputs a CLK signal of eight bits to the transmission shift register 403 and the reception shift register 402 from the clock output control circuit 405. As a result of this, the serial data of eight bits that is sequentially input through the MOSI terminal is sequentially stored in the reception shift register 402. Thereafter, the microcomputer core 401 transfers the 8-bit data stored in the reception shift register 402 to the reception register 406 illustrated in FIG. 4.

The microcomputer core 401 additionally registers new 8-bit data of the setting device-unique ID transferred to the reception register 406, in a variable of "comparison device-unique ID" in a memory (not illustrated) (S5 in FIG. 22).

For the data length of the device-unique ID of the microcomputer core 401 itself, the microcomputer core 401 determines whether or not data of a setting device-unique ID has been received (S6 in FIG. 22). When the determination is No in S6, the microcomputer core 401 returns to the process in S4, and continues the reception process of new 8-bit data of a setting device-unique ID. When the determination becomes Yes in S6, the microcomputer core 401 compares the setting device-unique ID completed in the variable of "comparison device-unique ID" with the device-unique ID of the microcomputer core 401 itself so as to determine whether or not they correspond to each other (S7 in FIG. 22).

When the determination is Yes in S7, the microcomputer core 401 enters a state in which it waits to receive the serial data (which corresponds to the data 603 in FIG. 6) of a remaining bus-unique ID input through the MOSI terminal of FIG. 4 (S9 in FIG. 22). Specifically, by controlling the general-purpose one-bit register 408 (∩1), the microcomputer core 401 outputs a CLK signal of eight bits from the clock output control circuit 405 to the transmission shift register 403 and the reception shift register 402. As a result of this, the serial data of eight bits that is sequentially input through the MOSI terminal is sequentially stored in the reception shift register 402. Thereafter, the microcomputer core 401 transfers the 8-bit data stored in the reception shift register 402 to the reception register 406 of FIG. 4.

The microcomputer core 401 additionally registers new 8-bit data of the bus-unique ID transferred to the reception register 406, in a variable of "bus-unique ID" in a memory (not illustrated) (S10 in FIG. 22). By the microcomputer core 401 repeating the processes in S9 and S10 above, all the pieces of data are collected in the variable of "bus-unique ID" at the end.

At the timing when all the pieces of the data are collected in the variable of "bus-unique ID" in a memory, a value of one is set in the general-purpose one-bit register 408 (#0) from the one-clock decision circuit 404 by the control performed by the SPI master device 101 so that an interrupt process occurs. As a result of this, the microcomputer core 401 determines that the state of a communication termination has started for the bus-unique ID setting process, clears the general-purpose one-bit register 408 (#0) in FIG. 4, and changes the setting so that an interrupt process will not occur in this register. Thereafter, the microcomputer core 401 shifts the control to step A in FIG. 22. When all the pieces of data are collected in the variable of "bus-unique ID" in a memory, the microcomputer core 401 registers the value in a memory etc. as the bus-unique ID registered for the microcomputer core 401 itself (S12 in FIG. 22).

Thereafter, the microcomputer core 401 terminates the bus-unique ID setting process in S9 in FIG. 20 (S13 in FIG. 22), which is explained by the flowchart of FIG. 22, and returns to the monitoring processes from S9 through S2 in FIG. 20.

When the determination is No in S7, i.e., when the setting device-unique ID completed in the variable of "comparison device-unique ID" in a memory does not correspond to the device-unique ID for the microcomputer core 401 itself, the microcomputer core 401 performs the next process. The microcomputer core 401 clears the value of the variable of "bus-unique ID" in a memory so as to shift to S12 (S8 in FIG. 22). As a result of this, the bus-unique ID is not set for the microcomputer core 401, and the microcomputer core 401 terminates the bus-unique ID setting process in S9 in FIG. 20 (S13 in FIG. 22), which is explained by the flowchart of FIG. 22, and returns to the monitoring processes from S9 through S2 in FIG. 20.

FIG. 23 illustrates a configuration example of the transmission system 100 illustrated in FIG. 1 in a personal computer main board. In this configuration example, an SPI temperature sensor corresponding to the second SPI slave device 103 of FIG. 1 is connected to the SPI master device on a main board corresponding to the SPI master device 101 in FIG. 1. A case is assumed for example in which a product line-up includes the following products.
1. Device without a temperature sensor
2. Device with one temperature sensor
3. Device with two temperature sensors When the products in the above line-up are implemented in the configuration example illustrated in FIG. 23, they will have the following features:
1. Only four wires exist, permitting parallel wiring;
2. Fewer wires are used, making wiring routes simple; and
3. The SPI master device can use a program to recognize how many temperature sensors there are, making it possible to use a common program to respond to a line-up of main boards. It is not necessary to update a program for each product of a line-up, making development and maintenance of programs easy.

FIG. 24A through FIG. 24C illustrate a configuration example of the transmission system 100 of FIG. 1 in an on-board system implemented in an automobile. In this configuration example, a temperature sensor and a rotation sensor that operate as the second SPI slave device 103 of FIG. 1 are connected to an on-board computer operating as the SPI master device 101 of FIG. 1. A case is assumed for example in which product configurations include the following systems:
1. System with ABS (Anti-lock brake system) but without braking pad temperature sensor; and
2. System with ABS and braking pad temperature sensor.

A wiring example for an on-board system according to the present embodiment that realizes the above line-up is illustrated in FIG. 24A. In this wiring example, all the wires are four parallel lines and the branching connector is for responding to the line-up. This wiring example has the following features.

Only four wires exist, permitting parallel wiring. FIG. 24B and FIG. 24C illustrate conventional wiring examples respectively for the above product configuration examples 1 and 2. As illustrated in these figures, not a small number (such as seven, eleven, or other numbers) of long wires were conventionally to be prepared. By contrast, the wiring example illustrated in FIG. 24A to which the present embodiment is applied realizes an on-board system with a reduced number of wires and also realizes a common use over different line-ups.

The on-board computer can respond to a line-up by using a common program. It is not necessary to change a program for each line-up, making development and maintenance of programs easy.

The embodiment described above are related to a transmission system in which a plurality of slave devices are used in such a manner that first slave devices based on a general scheme and second slave devices based on the extended scheme coexist. In transmission systems according to different embodiments, first slave devices do not necessarily exist. In other words, the present invention can also be applied to a case where a second slave device based on the same extended scheme as that of a different slave device is added to the different slave device. In such a case, in the transmission system between the master device and all slave devices, a slave select signal line is used in common as just a single signal line.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission system comprising:
 a master device; and
 a plurality of slave devices including a first slave device and a second slave device, each of the plurality of slave devices having its own identifier, wherein
 the master device includes a processor configured to:
  transmit a control signal to the plurality of slave devices at a first timing, a signal length of the control signal being determined such that the first slave device does not respond to the control signal; and
  transmit an identifier that identifies the second slave device to the plurality of slave devices at a second timing after the first timing,
 the second slave device transmits data to the master device when the second slave device receives the control signal and the identifier that identifies the second slave device, and
 the master device:
  controls a logical state of a slave select signal line for transmitting the control signal to be in a first logical state for a length of one clock of a clock signal so as to report a start of a communication to the slave devices other than the first slave device;
  controls a logical state of the slave select signal line to be in a second logical state after reporting a start of a communication to the slave devices other than the first slave device so as to provide a communication period; and
  controls the logical state of the slave select signal line that has been controlled to be in the second logical state during the communication period to be in the first logical state for a length of one clock of the clock signal so as to report a termination of the communication to the slave devices other than the first slave device.

2. The transmission system according to claim 1, wherein when the master device controls a logical state of the slave select signal line to be in the first logical state during a period other than the communication period, the master device and the first slave device conduct a communication of serial data in synchronization with the clock signal.

3. The transmission system according to claim 2, wherein
 the master device transmits an identifier search command and a search-target device-unique identifier to the plurality of slave devices during the communication period;
 the second slave device compares the search-target device-unique identifier received together with the identifier search command with a device-unique identifier of the second slave device, outputs a response with a first logical state when the compared identifiers correspond to each other, and outputs a response with a second logical state when the compared identifiers do not correspond to each other; and
 the master device stores the search-target device-unique identifier in a memory in association with the second slave device when the response received from the second slave device is a first logical state.

4. The transmission system according to claim 2, wherein the master device transmits an identifier setting command, a device-unique identifier registered in a memory and a bus-unique identifier with a data length different from that of the device-unique identifier to the plurality of slave devices during the communication period; and
 the second slave device sets the bus-unique identifier for the second slave device when the device-unique identifier received together with the identifier setting command corresponds to a device-unique identifier of the second slave device.

5. The transmission system according to claim 4, wherein
 the master device transmits an identifier specifying command and a bus-unique identifier for identifying a correspondent device to the plurality of slave devices during the communication period; and
 the second slave device compares the bus-unique identifier received together with the identifier specifying command with the bus-unique identifier set for the second slave device, conducts a data communication in synchronization with the clock signal with the master device at a timing when a logical state of the slave select signal line becomes a second logical state after the termination of the communication when the compared identifiers correspond to each other, and refrains from responding to data received from the master device until an identifier cancellation command or a resetting command is received when the compared identifiers do not correspond to each other.

6. The transmission system according to claim 3, wherein the slave select signal line is implemented by one signal line connecting the master device and a plurality of slave devices that are searched for by the identifier search command.

7. A master device to which a plurality of slave devices are connected, each of the plurality of slave devices having its own identifier, the master device comprising a processor configured to:
 transmit a control signal to the plurality of slave devices at a first timing, a signal length of the control signal being determined such that the first slave device does not respond to the control signal; and
 transmit an identifier that identifies a second slave device among the plurality of slave devices to the plurality of slave devices at a second timing after the first timing so as to provide data communication between the master device and the second slave device, and
 the master device:
  controls a logical state of a slave select signal line for transmitting the control signal to be in a first logical state for a length of one clock of a clock signal so as to report a start of a communication to the slave devices other than the first slave device;
  controls a logical state of the slave select signal line to be in a second logical state after reporting a start of a communication to the slave devices other than the first slave device so as to provide a communication period; and
  controls the logical state of the slave select signal line that has been controlled to be in the second logical state during the communication period to be in the first logical state for a length of one clock of the clock signal so as to report a termination of the communication to the slave devices other than the first slave device.

* * * * *